(12) United States Patent
Lee et al.

(10) Patent No.: US 11,516,692 B2
(45) Date of Patent: Nov. 29, 2022

(54) DISTANCE MEASUREMENT METHOD OF USER EQUIPMENT IN WIRELESS COMMUNICATION SYSTEM AND TERMINAL USING METHOD

(71) Applicant: LG Electronics Inc., Seoul (KR)

(72) Inventors: Seungmin Lee, Seoul (KR); Hyukjin Chae, Seoul (KR); Hanbyul Seo, Seoul (KR); Sangrim Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 287 days.

(21) Appl. No.: 16/652,885

(22) PCT Filed: Nov. 8, 2018

(86) PCT No.: PCT/KR2018/013560
§ 371 (c)(1),
(2) Date: Apr. 1, 2020

(87) PCT Pub. No.: WO2019/093794
PCT Pub. Date: May 16, 2019

(65) Prior Publication Data
US 2020/0296614 A1    Sep. 17, 2020

Related U.S. Application Data

(60) Provisional application No. 62/583,417, filed on Nov. 8, 2017.

(51) Int. Cl.
*H04W 28/02* (2009.01)
*H04W 28/12* (2009.01)
*H04W 64/00* (2009.01)

(52) U.S. Cl.
CPC ......... *H04W 28/021* (2013.01); *H04W 28/12* (2013.01); *H04W 64/00* (2013.01)

(58) Field of Classification Search
CPC ........... H04W 28/021; H04W 28/0221; H04W 28/0289; H04W 28/12; H04W 64/00; H04W 64/006
See application file for complete search history.

(56) References Cited

U.S. PATENT DOCUMENTS

| 7,711,268 | B2 | 5/2010 | Kazawa et al. |
| 8,699,990 | B2 | 4/2014 | Bussan et al. |
| 2014/0119210 | A1* | 5/2014 | Bansal ................ H04L 47/263 370/252 |
| 2017/0025015 | A1 | 1/2017 | Thompson et al. |
| 2018/0048577 | A1* | 2/2018 | Gulati ..................... H04L 47/12 |
| 2021/0286041 | A1* | 9/2021 | Jiang .......................... G01S 5/10 |

FOREIGN PATENT DOCUMENTS

| KR | 100960533 | 6/2010 |
| KR | 100972081 | 7/2010 |

* cited by examiner

*Primary Examiner* — Khoa Huynh
(74) *Attorney, Agent, or Firm* — Dentons US LLP

(57) ABSTRACT

A distance measurement method of user equipment in a wireless communication system is provided. The method comprises receiving a plurality of ranging request signals and transmitting a plurality of ranging response signals for the plurality of ranging request signals, wherein the number of transmitted ranging response signals is less than or equal to a maximum response signal number, and the maximum response signal number is determined on the basis of a channel busy ratio (CBR) measured by the terminal.

7 Claims, 20 Drawing Sheets

FIG. 5
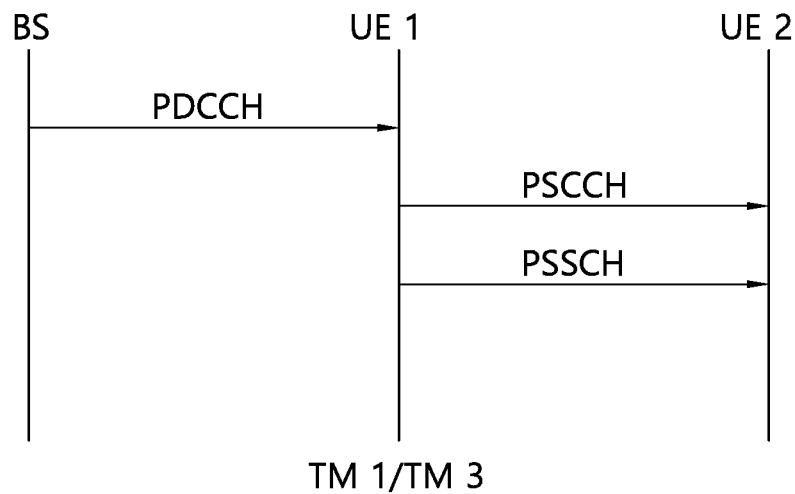
(a)
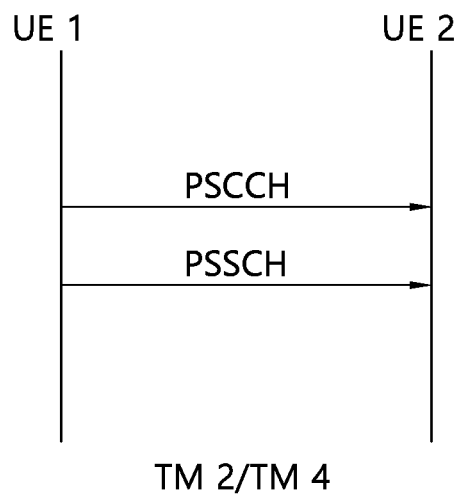
(b)

DISTANCE MEASUREMENT METHOD OF USER EQUIPMENT IN WIRELESS COMMUNICATION SYSTEM AND TERMINAL USING METHOD

This application is the National Stage filing under 35 U.S.C. 371 of International Application No. PCT/KR2018/013560, filed on Nov. 8, 2018, which claims the benefit of U.S. Provisional Application No. 62/583,417 filed on Nov. 8, 2017, the contents of which are all hereby incorporated by reference herein in their entirety.

BACKGROUND OF THE DISCLOSURE

Field of the Disclosure

The present disclosure relates to wireless communication and, most particularly, to a method for measuring distances of a user equipment (UE) in a wireless communication system and a user equipment using the same.

Related Art

Interest has recently been growing in the Device-to-Device (D2D) technology, wherein direct communication is carried out between devices. Most particularly, D2D is drawing attention as the communication technology for public safety network. Although the commercial communication network is quickly shifting to LTE, due to the problem of collision with the legacy communication standard and the issue of cost, the current public safety network is still mostly based on the 2G technology. Such gap between the communication technologies and demand for more enhanced services are now leading to efforts in seeking to enhance the public safety network.

The above-described D2D communication may be extended and applied to signal transception between vehicles, and communication related to vehicles is particularly referred to as Vehicle-to-Everything (V2X) communication. In V2X, the term 'X' may denote Pedestrian, and, in this case, V2X may be indicated as V2P. Alternatively, the term 'X' may denote Vehicle, and, in this case, V2X may be indicated as V2V. Similarly, the term 'X' may denote Infrastructure/Network, and, in this case, V2X may be indicated as V2I/V2N, and so on. Meanwhile, Cellular (C)-V2X means V2X communication that is based on a cellular communication technology.

A more accurate inter-user equipment (UE) ranging (or distance measurement) is required in V2X communication. Herein, in case a large number of ranging signals are being transmitted in a situation where multiple UEs are concentrated, there may occur problems, such as half-duplex, collision of ranging signal transmission resources, ranging signal latency, degradation in performance of a V2X communication system, and so on. In order to resolve the aforementioned problems, a load control and/or congestion control method is needed.

SUMMARY OF THE DISCLOSURE

Technical Objects

A technical object that is to be achieved by the present disclosure is to provide a method for measuring distances of a user equipment (UE) in a wireless communication system and a user equipment using the same.

Technical Solutions

In one aspect, provided is a method for measuring a range in a wireless communication system, the method performed by a user equipment (UE) and comprising: receiving multiple ranging request signals; and transmitting multiple ranging response signals for the multiple ranging request signals, wherein a number of the transmitted ranging response signals is less than or equal to a maximum number of response signals, and wherein a maximum number of response signals is determined based on a channel busy ratio (CBR) measured by the UE.

In addition to the maximum number of response signals, at least one of a maximum allowed transmission power, an allowed transmission resource size, and a number of retransmissions of the transmitted ranging response signals may be determined based on the CBR measured by the UE.

The CBR may be a ranging request signal-specific CBR.

Among the multiple ranging request signals received by the UE, in case a number of successfully decoded ranging request signals is greater than the maximum number of response signals, ranging response signals for ranging request signals having a reception power relatively greater than a predetermined threshold value may be transmitted preferentially.

Among the multiple ranging request signals received by the UE, in case a number of successfully decoded ranging request signals is greater than the maximum number of response signals, ranging response signals for ranging request signals having a relatively longer transmission period may be transmitted preferentially.

Among the multiple ranging request signals received by the UE, in case a number of successfully decoded ranging request signals is greater than the maximum number of response signals, ranging response signals for ranging request signals for services having relatively higher predetermined priority levels may be transmitted preferentially.

In another aspect, provided is a method for measuring a range in a wireless communication system, the method performed by a user equipment (UE) and comprising: based on density of neighboring UEs of the UE or channel busy ratio (CBR), determining at least one of a transmission resource for a ranging request signal, a transmission resource for a ranging response signal, a transmission power of a ranging request signal; transmitting a ranging request signal based on the determination; and transmitting information on the determined transmission resource for the ranging response signal to a UE receiving the ranging request signals, wherein the determined transmission resource for the ranging response signal is applicable to the UE receiving the ranging request signal.

As at least one of the density of the neighboring UEs of the UE or the CBR is relatively higher, the UE may determine a relatively smaller size of the transmission resource for the ranging request signal or a relatively lower transmission power of the ranging request signal.

As at least one of the density of the neighboring UEs of the UE or the CBR is relatively higher, the UE may determine a relatively larger size of the transmission resource for the ranging request signal.

The UE may transmit the ranging request signals only in case the density of the neighboring UEs of the UE is greater than a predetermined threshold value.

The CBR may be a value received by the UE, the value being measured by another UE.

The information may be transmitted via broadcast.

The information may be transmitted through a pre-defined channel.

A latency level of the ranging signals may be further determined based on at least one of the density or the CBR of the neighboring UEs of the UE, wherein the latency level may be determined by further considering a speed of the UE.

In another aspect, provided is a user equipment (UE), comprising: a transceiver transmitting and receiving radio signals; and a processor being operatively connected to the transceiver, wherein the processor is configured for: based on density of neighboring UEs of the UE or channel busy ratio (CBR), determining at least one of a transmission resource for a ranging request signal, a transmission resource for a ranging response signal, a transmission power of a ranging request signal; transmitting a ranging request signal based on the determination; and transmitting information on the determined transmission resource for the ranging response signal to a UE receiving the ranging request signals, wherein the determined transmission resource for the ranging response signal is applicable to the UE receiving the ranging request signal.

Effects of the Disclosure

According to the present disclosure, a congestion level may be decreased by adjusting a number of transmissions of ranging response signals, and, at the same time, by configuring a condition for determining ranging request signals that need to be responded to at a higher priority, a more efficient ranging operation may be performed.

Furthermore, since a UE may be capable of determining a level of transmission power of ranging signals and/or an amount of transmission resources of the ranging signals according to the density, number or congestion level of neighboring wireless communication UEs, when performing the ranging operation, an efficient power and resource management may be performed based on the density, number or congestion level of the neighboring wireless communication UEs.

BRIEF DESCRIPTION OF THE DRAWINGS

FIG. 5 illustrates a UE operation according to transmission mode (TM) related to V2X/D2D.

DESCRIPTION OF EXEMPLARY EMBODIMENTS

Figure 1:
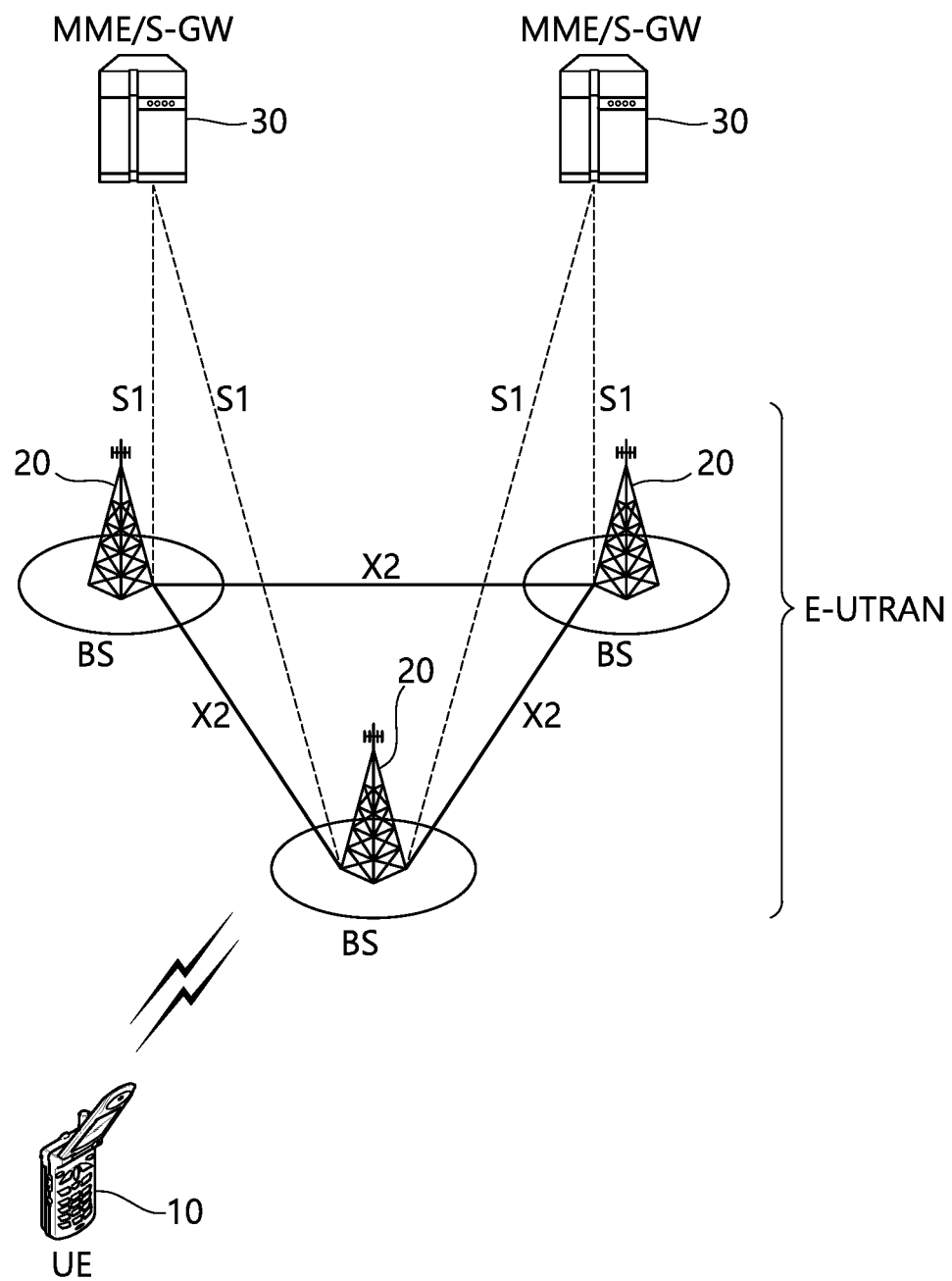
FIG. 1 shows a wireless communication system.

FIG. 1 shows a wireless communication system.

The wireless communication system may be referred to as an Evolved-UMTS Terrestrial Radio Access Network (E-UTRAN) or a Long Term Evolution (LTE)/LTE-A system, for example.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

The wireless communication system may be a TDD (time division duplex) system, a FDD (frequency division duplex) system, or a system using both of the TDD and the FDD.

Figure 2:
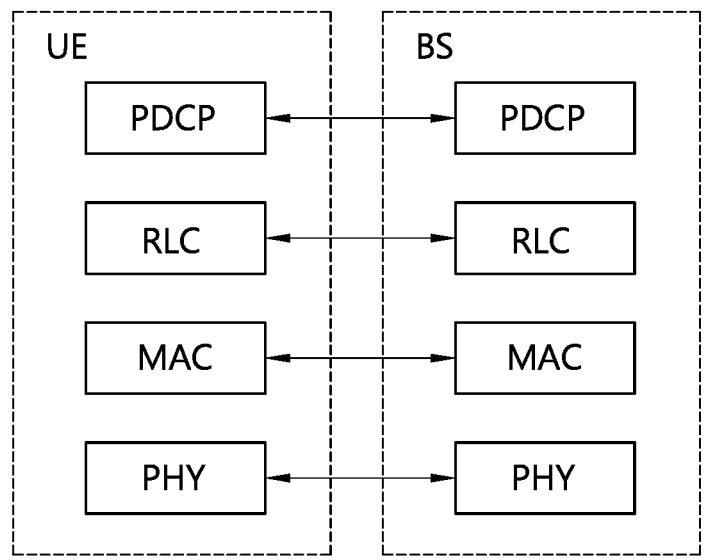
FIG. 2 is a diagram showing a wireless protocol architecture for a user plane.
Figure 3:
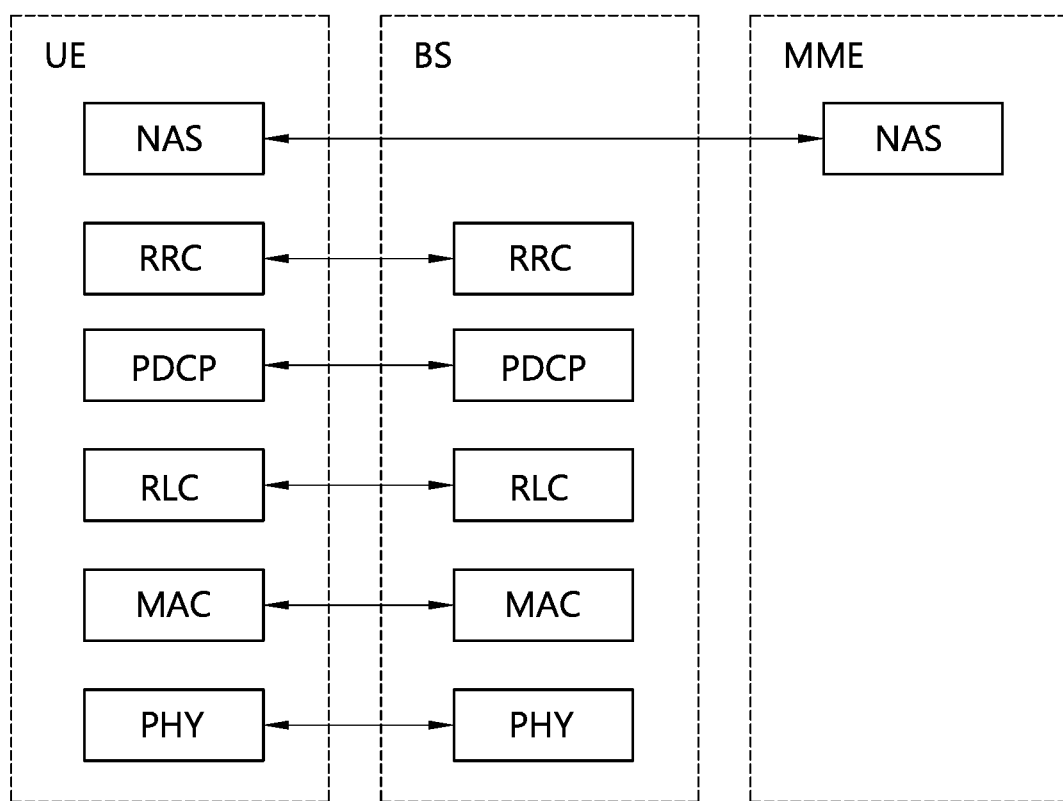
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, vehicle to everything (V2X) communication will be described. V2X denotes communication between a user equipment (UE) being installed in a vehicle and another UE. Herein, the other UE may be a pedestrian, a vehicle, an infrastructure. At this point, V2X may be referred to as vehicle to pedestrian (V2P), vehicle to vehicle (V2V), vehicle to infrastructure (V2I), respectively.

V2X communication may transceiver data/control information via sidelink being defined in a D2D operation and not uplink/downlink between a base station and UE being used in the legacy LTE communication.

In a sidelink physical channels may be defined as described below.

Physical Sidelink Broadcast Channel (PSBCH) is a physical sidelink broadcast channel. Physical Sidelink Control Channel (PSCCH) is a physical sidelink control channel. Physical Sidelink Discovery Channel (PSDCH) is a physical sidelink discovery channel. Physical Sidelink Shared Channel (PSSCH) is a physical sidelink shared channel Sidelink Synchronization Signal (SLSS) is a sidelink synchronization signal. An SLSS may include a Primary Sidelink Synchronization Signal (PSSS) and a Secondary Sidelink Synchronization Signal (SSSS). The SLSS and the PSBCH may be transmitted together.

A sidelink may denote a UE-to-UE (or inter-UE) interface between, and a sidelink may correspond to a PC5.

Figure 4:
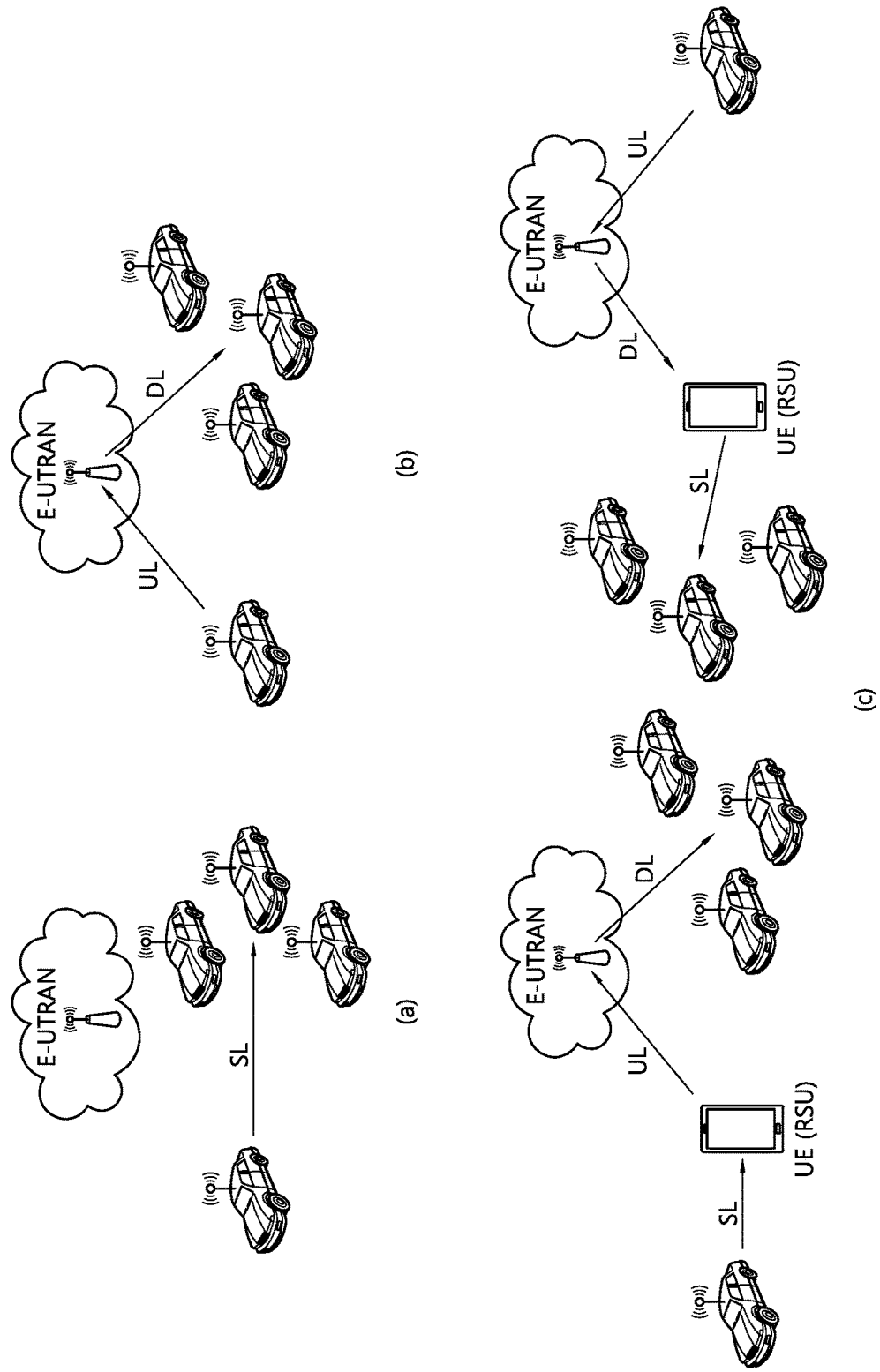
FIG. 4 illustrates scenarios for V2X communication.

FIG. 4 shows exemplary scenarios for V2X communication.

Referring to FIG. 4(a), V2X communication may support information exchange operations (between UEs) based on PC5, which is an inter-UE interface, and, as shown in FIG. 4(b), V2X communication may also support information exchange operations (between UEs) based on Uu, which is an interface between a base station (eNodeB) and a UE. Additionally, as shown in FIG. 4(c), V2X communication may also support information exchange operations (between UEs) based on both PC5 and Uu.

FIG. 5 shows exemplary UE operations according to a transmission mode (TM) related to V2X/D2D.

FIG. 5(a) relates to Transmission modes 1 and 3, and FIG. 5(b) relates to Transmission modes 2 and 4. In Transmission modes 1/3, the base station may perform resource scheduling to UE 1 through a PDCCH (more specifically, DCI), and UE 1 may perform D2D/V2X communication with UE 2 in accordance with the corresponding resource scheduling. After transmitting sidelink control information (SCI) to UE 2 through a physical sidelink control channel (PSCCH), UE 1 may transmit data that is based on the SCI through a physical sidelink shared channel (PSSCH). Transmission mode 1 may be applied to D2D, and Transmission mode 3 may be applied to V2X.

Transmission modes 2/4 may be modes according to which the UE performs self-scheduling. More specifically, Transmission mode 2 may be applied to D2D, wherein the UE may select a resource by itself from a configured resource pool and perform D2D operations. Transmission mode 4 may be applied to V2X, wherein, after performing sensing/SA decoding processes, and so on, the UE may select a resource by itself from a selection window and may then perform V2X operations. After transmitting SCI to UE 2, UE 1 may transmit data that is based on the SCI through the PSSCH. Hereinafter, the term Transmission mode may be briefly referred to as Mode.

Control information being transmitted by the base station to the UE through the PDCCH may be referred to as downlink control information (DCI), whereas control information being transmitted by the UE to another UE through the PSCCH may be referred to as SCI. The SCI may transfer (or deliver) sidelink scheduling information. Various formats may exist in the SCI, e.g., SCI Format 0 and SCI Format 1 may exist in the SCI.

SCI Format 0 may be used for scheduling of a PSSCH. SCI Format 0 may include a frequency hopping flag (1 bit), a resource block allocation and hopping resource allocation field (the number of bits may vary in accordance with the number of resource blocks of the sidelink), a time resource pattern (7 bits), a modulation and coding scheme (MCS) (5 bits), a time advance indication (11 bits), a group destination ID (8 bits), and so on.

SCI Format 1 may be used for scheduling of a PSSCH. SCI Format 1 may include priority (3 bits), resource reservation (4 bits), frequency resource location of initial transmission and retransmission (the number of bits may vary in accordance with the number of sub-channels of the sidelink), time gap between initial transmission and retransmission (4 bits), MCS (5 bits), retransmission index (1 bit), reserved information bits, and so on. Reserved information bits may be briefly referred to as reserved bits. The reserved bits may be added until a bit size of SCI Format 1 becomes 32 bits. More specifically, SCI Format 1 includes multiple fields each including different types of information. And, herein, the remaining number of bits from excluding the total number of bits of the multiple fields from the fixed total number of bits (32 bits) of SCI Format 1 may be referred to as the reserved bits.

SCI Format 0 may be used in Transmission modes 1 and 2, and SCI Format 1 may be used in Transmission modes 3 and 4.

Hereinafter, a distance measurement technique in wireless communication systems will be described.

The method/apparatus in accordance with the following distance measurement techniques may be utilized in using distance, direction, and location between wireless communication systems. The following method/apparatus may be applied to the above-described V2X or may be utilized in general wireless communication. For example, it may be used to measure the distance between a particular entity (e.g., a vehicle) and another entity in a V2X system, or to measure the coordinates of a particular entity on a 3GPP network.

In the conventional 3GPP LTE system, the position was measured based on Observed Time Difference Of Arrival (OTDOA). OTDOA is a technology embodied through 3GPP Rel-9 and the like and uses at least three base stations including a serving base station. Specifically, in order to measure the location of a UE, two hyperbolic equations are generated based on Reference Signal Time Difference (RSTD) information of the base station downlink signal, and an operation for obtaining a solution of the equation is performed. However, for distance measurement based on OTDOA, time synchronization between entities transmitting signals for distance measurement should be ensured.

The distance measuring technique according to the present specification does not need to secure time synchronization of the transmitter and the receiver, as described below, and provides higher accuracy than the conventional technique. As a result, it can be applied to a V2X system requiring accurate distance measurement, and can be applied to various systems requiring precise distance measurement.

The distance measurement technique according to the present specification may include a method of measuring a distance between wireless communication devices. For example, the apparatuses (i.e., the transmitter and the receiver) that are subject to the distance measurement may measure the distance by using phase information of radio signals transmitted from each other. In the following example, a situation of transmitting and receiving a signal using two frequencies w1 and w2 has been described, but the number of frequencies used for transmission and reception may be variously determined. In addition, the examples described below assume a situation of transmitting a plurality of frequencies at the same time, but it is also possible to apply the principles of the present specification in consideration of the transmission at a different predetermined time point.

Hereinafter, a specific example of the distance measuring technique according to the present specification will be described based on equations, and then the specific technique according to the present specification will be described through generalized terms.

When observing a radio signal transmitted at a specific point with an angular frequency w at a time t at a point place away from the transmission point by x, the observed signal is expressed by the following equation.

$$E(w,t,x)=A(x)*\exp(j*(w*t-k*x+\phi)) \qquad \text{[Equation 1]}$$

In the Equation, A means the amplitude (amplitude) of the radio signal at the location, k means a variable that satisfies the condition of $$k = \frac{w}{c},$$

and c means the speed of light.

Figure 6:
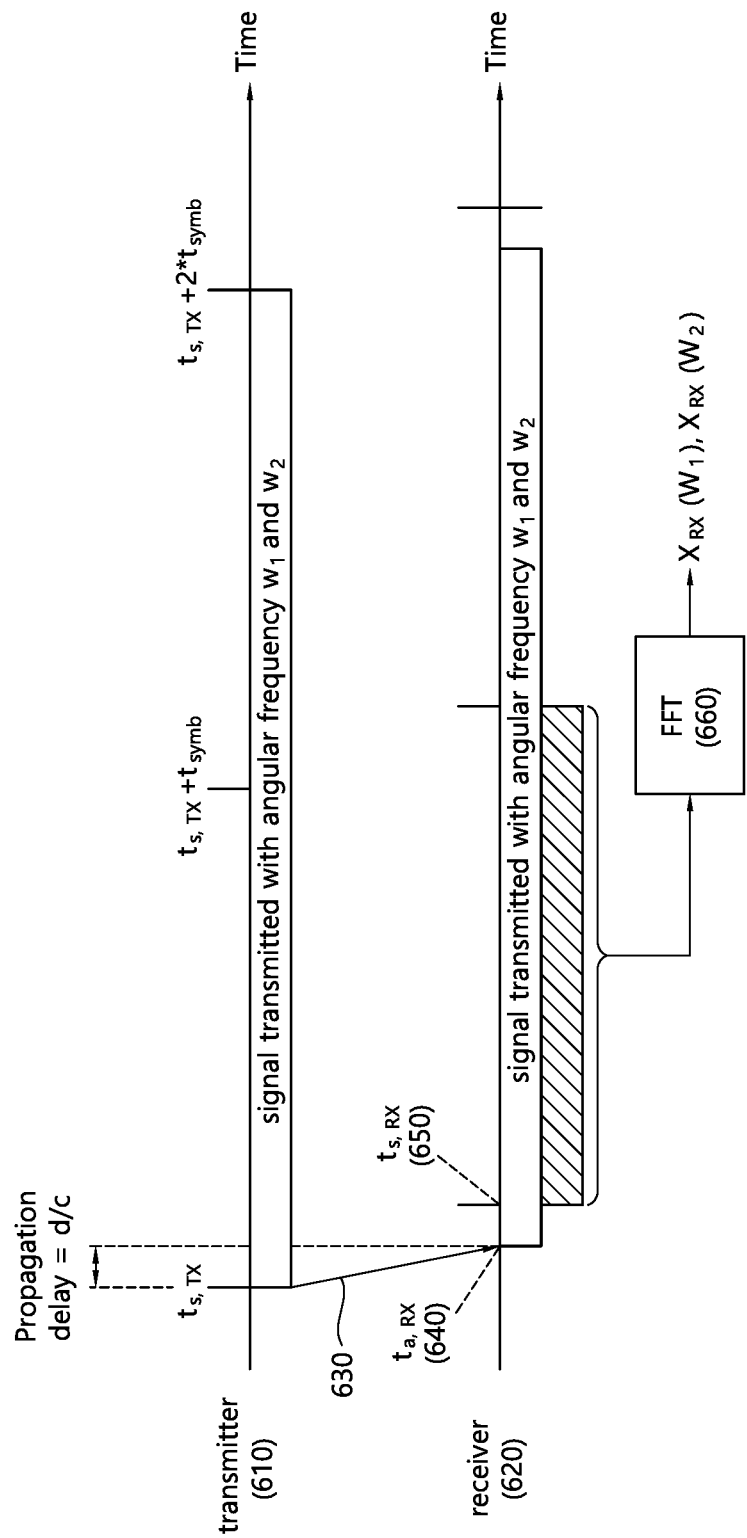
FIG. 6 is a diagram illustrating operations in a transmitter and a receiver.

FIG. 6 is a diagram illustrating operations in a transmitter and a receiver. The transmitter is a device for transmitting a transmission signal for distance measurement, and the receiver is a device which receives the corresponding transmission signal, processes the received transmission signal, and then transmits the reception signal generated by the receiver, to the transmitter. An example of FIG. 6 relates to a technique by which a transmitter measures a distance between the transmitter and a receiver via the reception signal.

In the example described below, it is assumed that a time point at which a transmitter and a receiver perform signal transmission and reception operations is quantized. For example, when transmitting and receiving a signal based on OFDM, the boundary point of each OFDM symbol is a quantized time point for performing transmission and reception operations. For convenience, it is assumed that the start time of the transmitting and receiving operations of the transmitter and the receiver starts from $t_{s,TX}$ and $t_{s,RX}$, respectively, and it is assumed that they appear repeatedly for each $t_{symb}$. In the case of OFDM, $t_{symb}$ may be the length of an OFDM symbol.

The transmitter is located at x=0 and transmits the distance measurement signal (i.e., transmission signal) through two frequencies w1 and w2 at $t=t_{s,TX}$. In this case, the initial phases of the two frequency components of the transmission signal may be set to be the same or may be set to be different from each other by a preset amount. Hereinafter, an example in which the initial phases are the same will be described for convenience of description. In this case, the transmission signal observed at the location of the transmitter is then shown below.

$$E(w_1,t,x=0)=A(0)*\exp(j*(w_1*(t-t_{s,TX})+\phi)),$$

$$E(w_2,t,x=0)=A(0)*\exp(j*(w_2*(t-t_{s,TX})+\phi))  \quad \text{[Equation 2]}$$

It is assumed that the receiver is placed away from the transmitter by d. The signal transmitted by the transmitter at $t=t_{s,TX}$ arrives at the receiver at $t=t_{a,RX}=t_{s,TX}+dc$. The signal observed by the receiver is shown below.

$$E(w_1,t,x=d)=A(d)*\exp(j*(w_1*t-w_1*t_{s,TX}-k_1*d+\phi)),$$

$$E(w_2,t,x=d)=A(d)*\exp(j*(w_2*t-w_2*t_{s,TX}-k_2*d+\phi)),  \quad \text{[Equation 3]}$$

As previously assumed, it is assumed that the point in time at which the receiver can actually start to process the transmission signal (for example, the OFDM processing point in the receiver) is quantized and the above signal is processed at $t=t_{s,RX}$. In the example of FIG. 6, it is assumed that OFDM processing using fast Fourier transform (FFT) is performed. The form of multiplying sinusoidal signals of various frequencies appearing as multiples of the fundamental frequency with initial phase=0 at $t=t_{s,RX}$, and adding the result values is shown. In this case, it is remained only when the sinusoidal signal of the same frequency as the frequency of the reception signal is multiplied due to the property of the FFT, and in the case that it is multiplied with other frequencies, it becomes 0 in the summing-up process. According to the attributes of the FFT operation/process as described above, the value $X_{RX}(w_1)$ obtained by the receiver for the frequency w1 component as the FFT result is expressed by the following equation.

$$\begin{aligned}X_{RX}(w_1) &= E(w_1, t, x=d)*\exp(-j*w_1(t_{s,RX})) \quad \text{[Equation 4]}\\ &= A(d)*\exp(j*(w_1*t - w_1*t_{s,TX} - \\ & \quad k_1*d - w_1*t + w_1*t_{s,RX} + \phi))\\ &= A(d)*\exp(j*(w_1*t_{s,RX} - w_1*t_{s,TX} - \\ & \quad k_1*d + \phi)) = A(d)*\exp(j*(w_1(t_{s,RX} - \\ & \quad t_{a,RX}) + \phi))\end{aligned}$$

The above-described FFT operation/process is equally applied to the frequency w2 component, and the resulting value $X_{RX}(w_2)$ is expressed as follows.

$$X_{RX}(w_2)=A(d)*\exp(j*(w_2(t_{s,RX}-t_{a,RX})+\phi))  \quad \text{[Equation 5]}$$

The receiver may compare the two values ($X_{RX}(w_1)$, $X_{RX}(w_2)$) obtained through the above equation as follows.

$$\frac{X_{RX}(w_2)}{X_{RX}(w_1)} = \exp(j*(w_2-w_1)(t_{s,RX}-t_{a,RX}))  \quad \text{[Equation 6]}$$

Since the frequencies w1 and w2 of the transmission signal are known to the transmitter and the receiver, the receiver can calculate $t_{s,RX}-t_{a,RX}$ through Equation 6. Herein, $t_{s,RX}$ indicates a time point when the distance measurement signal is actually received by the receiver, and $t_{a,RX}$ indicates a time point of the OFDM processing by the receiver. As a result, the receiver may calculate a difference between the time point at which OFDM processing is started and the time point at which the actual signal reaches the receiver.

Through this, even if the receiver performs OFDM processing only at a specific quantized time point, the receiver may calculate the time when the signal transmitted by the specific transmitter actually arrives through appropriate phase calculation. In particular, this part is helpful when several devices transmit signals using different frequencies. Even if the receiver performs only a single FFT operation on the signal in which all signals overlap at a specific quantized point in time, the receiver may recognize a time point when an individual signal is received through subsequent simple phase calculations. In order for a receiver to recognize a time point of receiving an individual signal without using such an improve technique, very complex calculations and signal processing are required because it is necessary to determine whether a particular signal has arrived at each time point in the time dimension (for example, whether the value that correlates the expected signal with the actual signal is above a certain level).

The technical features described above will be described below with reference to FIG. 6.

The example of FIG. 6 may be used for distance measurement in a wireless communication system including a transmitter and a receiver that process signals in symbol units. In the example of FIG. 6, a symbol is a unit including conventional OFDM, OFDMA, and SC-FDMA symbols, and means a time unit for transmitting/receiving a radio signal. In FIG. 6, as described above, the transmitter 610 is a device for transmitting a transmission signal 630 for distance measurement, and a receiver 620 is a device that receives and processes a signal (that is, a transmission signal) transmitted by the transmitter 610.

As described above, the transmitter 610 may transmit the transmission signal 630 through a preset first frequency and a preset second frequency (e.g., w1, w2). That is, the transmission signal 630 may include a first transmission component for the first frequency w1 and may include a second transmission component for the second frequency w2. The transmission signal 630 including the second transmission component may be represented by Equation 2 and/or Equation 3 above.

The transmission signal 630 arrives at the receiver 620 at a "reception time point 640," which is represented by $t_{a,RX}$ in the above-described example. Since the receiver 620 processes the transmission signal 630 (e.g., processes OFDM) in units of symbols, the actual processing for the corresponding signal starts at the processing point 650. The processing time point 650 is represented by $t=t_{s,RX}$ in the above-described example.

The receiver 620 may calculate $X_{RX}(w_1)$ as shown in Equation 4 through the FFT operation 660 for the first transmission component, and may calculate $X_{RX}(w_2)$ as shown in Equation 5 through the FFT operation 660 for the second transmission component. As a result, the receiver 620 may compare two different FFT calculation values (for example, by applying Equation 6), to thereby calculate the difference between the processing time point 650 and the reception time point 640 in the receiver 620.

Meanwhile, the first frequency w1 and the second frequency w2 may be determined in consideration of various situations. As described in Equation 6, since the difference between the first frequency w1 and the second frequency w2 may be calculated by multiplying the difference between the processing time point 650 and the receiving time point 640, when the difference between the first frequency w1 and the second frequency w2 is set to be large, the difference between the processing time point 650 and the reception time point 640 may be easily obtained in the receiver 620. That is, on the condition that the difference between the first frequency and second frequency is large, even when the difference between the processing time point 650 and the reception time point 640 is small, the final result value of Equation 6 becomes large, so that a small difference can be easily found. However, when the difference between frequencies increases, errors may occur in the calculation due to the frequency selective characteristic of the channel. Accordingly, the difference between the preset frequencies may be fixed but may be adaptively determined in consideration of channel characteristics. For example, at the transmitter 610, the receiver 620, and/or a third entity, a set of possible frequencies may be signaled in advance, and then indication information about the frequency to be actually used may be signaled or information about the channel characteristics may be signaled to thereby indicate the frequency to be actually used.

On the other hand, as shown in Equation 6, the operation value in the receiver 620 is calculated in the form of a phase. Accordingly, there may be a problem in that the case where the value of $(w_2-w_1)(t_{s,RX}-t_{a,RX})$ exceeds the range of 360 degrees is not distinguished from the case where it is not. However, since the difference between the processing time point 650 and the reception time point 640 in the actual channel environment may be shorter than the symbol length, the above-described problem will not be a big problem in the actual system implementation.

Hereinafter, the present disclosure will be described in detail.

Firstly, a relationship between phases of a distance and a signal, which are needed for the understanding of the present disclosure, will be described in detail.

The range is a factor, which is primarily influenced by the hardware components and less by the localization principles PDOA (Phase Difference Of Arrival) in radio frequency identification (RFID) system. When localizing per PDOA the distance largely depends on the wavelength and the start phases of the signals emitted by the antennas and leading to an overflows in the stage. This does not allow clear identification of objects within these ambiguous areas. For a single antenna, the formula to calculate d depending on phase Ø is given as below.

$$d = \frac{\lambda}{2}\left(\frac{\emptyset}{2\pi} + n\right) \quad \text{[Equation 7]}$$

Here, d stands for the distance between reader antenna and tag, $\lambda$ is the wavelength, Ø describes the phase difference between transmitted and received signal and n is a positive integer, which shows that the distance, starting from the reader to the transponder is a multiple of $\lambda/2$ without the phase change. The phase results in dependence to the distance, but calculation of the distance in this case is not possible because of Equation below.

$$\emptyset = \emptyset_{int} + \emptyset_{prop} \quad \text{[Equation 8]}$$

Here, Ø represents the phase of signal, $\emptyset_{int}$ the internal phase in the tag and $\emptyset_{prop}$ the phase because the signal propagation. The parameter $\emptyset_{int}$ cannot be calculated. However, if two different frequencies of the tag are used, the value $\emptyset_{int}$ will be eliminated.

Hereinafter, a PDOA-based range estimation, which is needed for the understanding of the present disclosure, will be described in detail.

PDOA based approaches share the same concept as the dual-frequency techniques for range estimation being applied in radar systems where signals with two basic frequencies are used, and the phase difference observed at the two frequencies is used to estimate the range of the reflecting objects. Consider that a RFID reader transmits two continuous-wave (CW) signals at frequencies $f_1$ and $f_2$. Without considering the modulation performed at the RFID tag and the receiver noise, the phase of the uplink signal at frequency $f_i$ can be expressed as below.

$$\emptyset_i = 4\pi f_i d/c \quad \text{[Equation 9]}$$

here i=1, 2, $c=3\times10^8$ m/s is the velocity of RF signal propagation, and d is the range between the reader and tag. Therefore, range d can be estimated from the phase difference observed at the return signal corresponding to the two frequencies. In reality, the phase observation is subject to wrapping, that is, the phase at each frequency is observable only within the range of Equation 10 below.

$$0 \leq \emptyset_i < 2\pi \quad \text{[Equation 10]}$$

As a result, the tag range is estimated as below.

$$\hat{d} = \frac{c\Delta\emptyset}{4\pi(f_2-f_1)} + \frac{cm}{2(f_2-f_1)} \quad \text{[Equation 11]}$$

$$0 \leq \Delta\emptyset = \emptyset_2 - \emptyset_1 < 2\pi \quad \text{[Equation 12]}$$

Here, $\Delta\emptyset$ is the wrapped phase difference observation and the range of $\Delta\emptyset$ is shown as Equation 12 above. Also, m is an unknown integer. The second term in the above Equation 11 denotes the range ambiguity due to phase wrapping. Because backscattering modulation changes the signal phase at both carrier frequencies in the same way, above equation remains valid when the backscattering modulation is applied. The maximum unambiguous range $d_{max}$ is shown as below.

$$d_{max} = c/2|f_2-f_1| \quad \text{[Equation 13]}$$

Hereinafter, a multi-frequency based range estimation, which is needed for the understanding of the present disclosure, will be described in detail.

The range estimation performance of the PDOA method based on dual-frequency signaling may suffer in different situations. One of the key limitation is the trade-off between the maximum unambiguous range and the sensitivity of range estimation to noise. That is, a large separation between the two frequencies may reduce the sensitivity of range estimation to additive noise, but doing so yields a small unambiguous range that may not be large enough for the RFID system and application of interest. Another problem raises when the signal at either or both of the two carrier frequencies are severely faded, thus yielding unreliable phase, and subsequently, range estimation from the received signals. The use of three or more carrier frequencies can overcome these issues and enhance the accuracy of phase difference through appropriate data fusion over different frequency pairs. Consequently, the estimation of tag range can be improved. Because different frequency pairs are likely to have varying level of range estimation quality, it is desirable to have weighted average of the range estimates rather than simple averaging. Generally, there are three key issues related to multifrequency-based range estimation, i.e., the range estimation in a multifrequency signaling system, the selection of frequencies, and the weighted fusion of range estimates obtained from different frequency pairs.

Hereinafter, a Direction of Arrival (DOA) estimation, which is needed for the understanding of the present disclosure, will be described in detail.

There is a one-to-one relationship between the direction of a signal and the associated received steering vector. It should therefore be possible to invert the relationship and estimate the direction of a signal from the received signals. An antenna array therefore should be able to provide for direction of arrival estimation. Also, there is a Fourier relationship between the beam pattern and the excitation at the array. This allows the direction of arrival (DOA) estimation problem to be treated as equivalent to spectral estimation.

Figure 7:
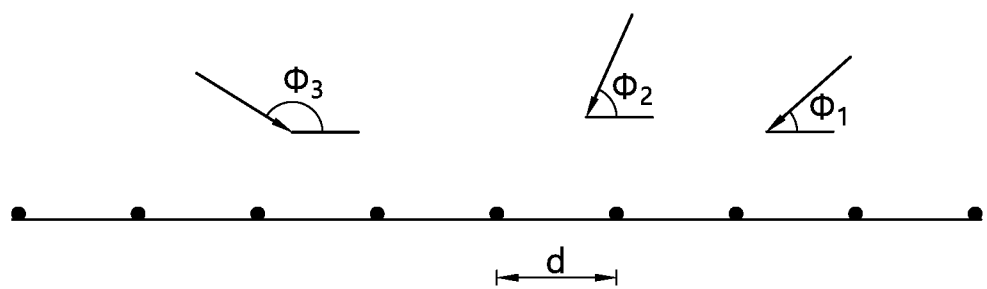
FIG. 7 shows a general diagram of an exemplary collision between multiple signals and an antenna array in order to described DOA estimation.

FIG. 7 shows a general diagram of an exemplary collision between multiple signals and an antenna array in order to described DOA estimation.

According to FIG. 7, each of the multiple (M) signals has a of direction and collides in an array having N number of factors, being linear, and having equal intervals. The object (or goal) of the DOA estimation is to estimate the of by using data received from the array. Herein, i=1, . . . , M. Generally, M<N. However, it will be assumed that there exists an approach method that does not have such limitations (e.g., maximum likelihood estimation). The estimation actually becomes difficult to perform due to the fact that an unknown number of signals synchronously collide with the array at unknown directions and unknown amplitudes. Additionally, the received signals are constantly damaged by noise. Correlation, maximum likelihood, MUSIC, ESPRIT, and a Matrix Pencil may be used in the DOA estimation.

Hereinafter, a Sidelink Received Signal Strength Indicator (RSSI) (S-RSSI), a Physical Sidelink Shared Channel (PSSCH) Reference Signal Received Power (PSSCH-RSRP), a Channel Busy Ratio (CBR), and a Channel Occupancy Ratio (CR), which are needed for the understanding of the present disclosure, will be described in detail.

<S-RSSI>

Sidelink RSSI (S-RSSI) may be defined as the linear average of the total received power (in [W]) per SC-FDMA symbol observed by the UE only in the configured sub-channel in SC-FDMA symbols 1, 2, . . . , 6 of the first slot and SC-FDMA symbols 0, 1, . . . , 5 of the second slot of a subframe.

Herein, the reference point for the S-RSSI may be the antenna connector of the UE.

If receiver diversity is in use by the UE, the reported value may not be lower than the corresponding S-RSSI of any of the individual diversity branches.

S-RSSI is applicable for RRC_IDLE intra-frequency, RRC_IDLE inter-frequency, RRC_CONNECTED intra-frequency, and/or RRC_CONNECTED inter-frequency.

<PSSCH-RSRP>

PSSCH Reference Signal Received Power (PSSCH-RSRP) may be defined as the linear average over the power contributions (in [W]) of the resource elements that carry demodulation reference signals associated with PSSCH, within the PRBs indicated by the associated PSCCH.

Herein, the reference point for the PSSCH-RSRP may be the antenna connector of the UE.

If receiver diversity is in use by the UE, the reported value may not be lower than the corresponding PSSCH-RSRP of any of the individual diversity branches.

PSSCH-RSRP is applicable for RRC_IDLE intra-frequency, RRC_IDLE inter-frequency, RRC_CONNECTED intra-frequency, and/or RRC_CONNECTED inter-frequency.

Herein, the power per resource element may be determined from the energy received during the useful part of the symbol, excluding the CP.

<CBR>

Channel busy ratio (CBR) measured in subframe n is defined as follows.

For PSSCH, CBR may be the portion of sub-channels in the resource pool whose S-RSSI measured by the UE exceed a (pre-)configured threshold sensed over subframes [n−100, n−1].

For PSCCH, in a pool (pre)configured such that PSCCH may be transmitted with its corresponding PSSCH in non-adjacent resource blocks, CBR may be the portion of the resources of the PSCCH pool whose S-RSSI measured by the UE exceed a (pre-)configured threshold sensed over subframes [n−100, n−1], assuming that the PSCCH pool is composed of resources with a size of two consecutive PRB pairs in the frequency domain.

CBR is applicable for RRC_IDLE intra-frequency, RRC_IDLE inter-frequency, RRC_CONNECTED intra-frequency, and/or RRC_CONNECTED inter-frequency.

Herein, the subframe index may be based on physical subframe index.

<CR>

Channel occupancy ratio (CR) evaluated at subframe n may be defined as follows.

CR may be the total number of sub-channels used for its transmissions in subframes [n−a, n−1] and granted in subframes [n, n+b] divided by the total number of configured sub-channels in the transmission pool over [n−a, n+b].

CR is applicable for RRC_IDLE intra-frequency, RRC_IDLE inter-frequency, RRC_CONNECTED intra-frequency, and/or RRC_CONNECTED inter-frequency.

Herein, a may be a positive integer and b may be 0 or a positive integer. a and b may be determined by UE implementation with a+b+1=1000, a>=500, and n+b should not exceed the last transmission opportunity of the grant for the current transmission.

Herein, CR may be evaluated for each (re)transmission.

Herein, in evaluating CR, the UE may assume the transmission parameter used at subframe n is reused according to the existing grant(s) in subframes [n+1, n+b] without packet dropping.

Herein, the subframe index may be based on physical subframe index.

Herein, CR can be computed per priority level.

Hereinafter, the present disclosure will be described in more detail.

For example, the following proposed methods propose a method for efficiently performing LOAD (or CONGESTION) CONTROL for ranging signals between wireless communication devices.

For example, the proposed methods of the present disclosure, most particularly, assume a situation where devices being target for performing ranging (or measuring distances) perform ranging by using phase information of radio signals being transmitted and received between the devices.

Additionally, for example, although the present disclosure assumes a situation where signals are transmitted/received by characteristically using two frequencies (or tones), the principle of the present disclosure may also be extendedly applied to a case where the number of frequencies (or tones) being used for transmission/reception is generalized.

Additionally, for example, although the present disclosure assumes a situation where multiple frequencies (or tones) are synchronously transmitted, transmission may also be performed at different predetermined time points, and the principle of the present disclosure may also be extendedly applied while considering this.

Additionally, for example, in the present disclosure although TWO-WAY RANGING (e.g., a ranging method where a receiver (that has successfully received a signal of a transmitter) feeds-back a signal of a transmitter and where the transmitter performs ranging by using a phase difference) situation is assumed, the principle of the present disclosure can be extendedly applied to various RANGING methods.

Additionally, for example, the term "configure (or define)" in the present disclosure can be extendedly interpreted as "designating by a network via (physical layer/higher layer) signaling (e.g., RADIO RESOURCE CONTROL (RRC), SYSTEM INFORMATION BLOCK (SIB))" and/or "(implicitly) designating/determining in accordance with a pre-defined rule".

Additionally, for example, the term "transmitter" (and/or "receiver") in the present disclosure can be interpreted as "(non-mobile) base station (or ROAD SIDE UNIT (RSU) or RELAY NODE)" and/or "(mobile) vehicle (or UE) (e.g., VEHICLE, PEDESTRIAN UE)".

Additionally, for example, the term "transmitter" (and/or "receiver") in the present disclosure can be extendedly interpreted as "receiver (and/or transmitter)".

Additionally, for example, the term RANGING SIGNAL TRANSMISSION related) "frequency (or tone)" in the present disclosure can be extendedly interpreted as a predetermined number of "subcarrier(s)" and/or "RESOURCE BLOCKs (RBs)", and so on.

Additionally, for example, in the present disclosure, the term "sensing" can be extendedly interpreted as an RSRP measurement operation for a "sequence" of a (successfully received) ranging signal and/or a "reference signal (or sequence) being used for demodulating/decoding of data (or payload) (being transmitted together)", or as an RSSI measurement operation based on a predetermined resource unit (e.g., subchannel).

Additionally, for example, for simplicity in the description of the present disclosure, the following abbreviations (or terms) will hereinafter be defined.

A signal being transmitted by a transmitter (for ranging) is defined as a Ranging Request Signal (REQ_SIG).

A response(/feedback) signal being transmitted by a receiver (that has successfully received the REQ_SIG) is defined as a Ranging Response Signal (REP_SIG).

Herein, for example, REQ_SIG and/or REP_SIG may be defined as a combined form of "reference signal (or sequence) and data (or payload)" (e.g., this may be transmitted through consecutive frequency resources having a predetermined size) and/or a "sequence" form.

Herein, for example, a reference signal (or sequence) of an electronic format may not only be used for estimating a distance between the transmitter/receiver but also for the purpose of demodulating/decoding data (or payload) (being transmitted together) (e.g., channel estimation).

Additionally, for example, in the present disclosure, the term "successfully received" may be interpreted as "successful sequence (or reference signal) detection" (related to REQ_SIG/REP_SIG) and/or "successful demodulating/decoding data (or payload) (being transmitted together)".

Additionally, for example, when selecting transmission resources related to REQ_SIG and/or REP_SIG, the (minimum) factors(/aspects) that shall be considered are as described below.

(Factor #1) HALF DUPLEX problem (e.g., wireless communication devices cannot perform transmission/reception operations synchronously at the same time point (for reasons of hardware limitations/self-interference, and so on)

In relation to (Factor #1), for example, after a receiver successfully receives a REQ_SIG of a (specific) transmitter, when transmitting a REP_SIG for the received REQ_SIG, (at least) a resource of a time point where the transmitter performs the transmission operation shall not be selected. Otherwise, the transmitter cannot be capable of receiving the REP_SIG, and (finally) it becomes impossible to perform a distance estimation between the transmitter and the receiver.

(Factor #2) Overhead problem for transmitting REP_SIG of receiver (or REQ_SIG of transmitter) (or CONGESTION CONTROL problem related to REP_SIG (or REQ_SIG) transmission)

In relation to (Factor #2), for example, having the receiver transmit a REP_SIG for all of the (successfully received) REQ_SIG may relatively reduce REQ_SIG reception opportunities (due to a half-duplex problem) or may increase a congestion level (due to excessive REP_SIG transmission).

(Factor #3) Collision/Interference problem between (REQ_SIG or REP_SIG) transmission resources In relation to (Factor #3), for example, when REQ_SIG transmission resources between different transmitter (or REP_SIG transmission resources between different receivers) do not overlap (as much as possible), reliability of the corresponding signal may be ensured.

(Factor #4) LATENCY between (transmissions of) (successfully received) REQ_SIG and (inter-linked) REP_SIG In relation to (Factor #4), for example, when considering (transmitter/receiver) mobility (and/or channel change on the time domain), and so on, quickly transmitting (or transmitting as quickly as possible) a REP_SIG for the (successfully received) REQ_SIG may help enhance ranging reliability (or performance).

For example, when considering (part) of the above-described factors(/aspects), the load (or congestion) control related to the ranging signals may be performed according to (part) of the method described below.

Herein, for example, (part) of the corresponding method may also be limitedly (or restrictedly) applied only in a case where (transmission) resources are selected based on sensing.

Hereinafter, methods that are proposed in this specification will be described in detail.

[Proposed Method #1] For example, having the receiver transmit a REP_SIG for the (successfully received)

REQ_SIG may not only aggravate the half-duplex problem (e.g., reducing REQ_SIG reception opportunities) but may also cause the problem of increasing the congestion level (e.g., degradation in the overall system performance).

In order to resolve such problems, for example, by having the receiver (A) not exceed a pre-configured (maximum) number of transmission allowed REP_SIGs (or (maximum) number of response allowed REQ_SIGs) (MAX_REPNUM) or (B) derive a MAX_REPNUM according to a (pre-defined) CBR measurement value, and, then, having the receiver not exceed the derived value.

In other words, in case a receiving UE performing two-way ranging operations receives multiple ranging request signals, the receiving UE may transmit response signals for the received multiple ranging request signals. Herein, if the number of response signals to be transmitted is not appropriately restricted (or limited), there may occur a problem of resources related to the ranging request signals and resources related to the response signals overlaying in the receiving UE and the transmitting UE, a half-duplex problem, and a problem of having the load size increase throughout the entire system.

Therefore, in over to overcome the aforementioned problems, this specification proposes a method for appropriately adjusting the number of response signals being transmitted by the receiving UE. In other words, a maximum number of response signals that can be transmitted by the receiving UE may be configured, and the receiving UE may be configured to transmit a number of response signals equal to or less than the configured maximum number of response signals. More specifically, the maximum number of response signals may be pre-configured in advance, or the receiving UE may measure the CBR and may determine the maximum number of response signals based on the measured CBR.

Herein, for example, mapping(/linkage) information between the CBR measurement value and the MAX_REPNUM may be pre-configured in advance.

Herein, for example, in addition to the MAX_REPNUM, information being mapped(/linked) to the CBR measurement value may include maximum (allowed) transmission power related to REP_SIG (e.g., including transmission omission) and/or number of (allowed) retransmissions and/or (allowed) transmission resource size and/or (allowed) range of link adaptation parameter (e.g., MCS) and/or maximum (allowed) maximum occupancy (CR) ratio, and so on.

Herein, for example, in the present disclosure, the term "CBR" may be interpreted as a (pre-defined) "REQ_SIG (specific) CBR" (and/or a "REP_SIG (specific) CBR" or a "ranging signal (specific) CBR").

In other words, in a method of determining a maximum number of response signals based on a CBR measured by a receiving UE, the relationship between the measured CBR value and the maximum number of response signals may be pre-configured in advance. Herein, in addition to the maximum number of response signals, elements being determined based on the measured CBR value may include at least one of a maximum allowed transmission power, an allowed transmission resource size, an allowed range of link adaptation parameter, and maximum CR, when the receiving UE transmits a number of response signals equivalent to the maximum number of response signals.

Meanwhile, as described above, in case the maximum number of response signals of the receiving UE is determined, and in case the number of ranging request signals that are successfully received or successfully decoded by the receiving UE is greater than the maximum number of response signals, the receiving UE shall determine for which one of the ranging request signals a response signal is to be transmitted at a higher priority. Herein, a reference for determining a ranging request signal for which a response signal is to be transmitted at a higher priority or a method for selecting a ranging request signal for which a response signal is to be transmitted at a higher priority may be needed. Hereinafter, the determination reference/selection method will be proposed.

Herein, for example, in case the number of REQ_SIGs (successfully) received by the receiver is greater than the MAX_REPNUM value, according to (part of) the following rules, the MAX_REPNUM value may be selected at a higher priority.

(Example #1-1) A REQ_SIG having a reception power that is higher (or lower) than a pre-determined threshold value (or a REQ_SIG of a transmitter being located at a relatively close (or far) distance) may be selected at a higher priority.

Herein, for example, the corresponding reception power may also be interpreted as an RSRP measurement value for a "sequence" and/or "a reference signal (or sequence) being used for demodulation/decoding (of the data or payload (being transmitted together)" of the (successfully received) REQ_SIG.

In other words, a ranging request signal having a high reception power may be a ranging request signal being transmitted from a transmitting UE being located at a relatively close distance, and this is because transmitting a response signal for such ranging request signal at a higher priority may not only relatively increase the chance of successfully performing the ranging operation but also, in the aspect of service, ranging of a transmitting UE being located at a (relatively) far distance may not be a primary target. Furthermore, by appropriately adjusting the threshold value, in the aspect of response signal transmission, the number of response signals being transmitted may be adjusted, and, as a result, efficient load control may be performed.

Herein, for example, the application of the corresponding rule may be useful in that (A) ranging for a transmitter, which is located outside of a valid distance (for ranging) (or located at a relatively far distance), may not be useful, and/or (B) the network is capable of performing load (or congestion) control related to REP_SIG transmission (by adjusting the corresponding threshold value), and/or (C) the half-duplex problem may be mitigated by preventing excessive REP_SIG transmission of the receiver.

(Example #1-2) A REQ_SIG related to a pre-configured application (or service) having a (relatively) high priority level (or a REQ_SIG related to an application (or service) of interest) may be selected at a higher priority.

In other words, the ranging operation may be used in various services, and the ranging operation related to service(s) having relatively higher priority level(s) may be performed at a higher priority. Thus, according to the priority level configuration, the ranging operation related to service(s) having relatively higher level of importance or level of interest may be performed at a higher priority.

Herein, for example, the corresponding rule may also be (limitedly) applied in case Application ID information (or Service ID information) is included in the REQ_SIG.

(Example #1-3) A REQ_SIG requesting its own REP_SIG transmission (e.g., a ranging (or response) (GROUP) ID information may be included in the REQ_SIG) may be selected at a higher priority.

In other words, information indicating a response of a specific receiving UE may be included in a ranging request signal, and, in case the specific receiving UE receives multiple ranging request signals including a ranging request signal including the aforementioned information, the specific receiving UE may transmit a response signal for the ranging request signal including the aforementioned information at a higher priority.

(Example #1-4) A REQ_SIG that is (successfully) received at a relatively long (or short) cycle period (or a REQ_SIG of a transmitter that has not performed its REP_SIG transmission for a relatively long (or short) period of time) may be selected at a higher priority.

In other words, by transmitting a response signal for a ranging request signal for which a relatively long period of time has passed, starting from the time point of its reception, at a higher priority, excessive latency in the ranging operations may be prevented.

Herein, for example, the corresponding rule may be (limitedly) applied to a case where a transmitter (group) ID information is included on the REQ_SIG.

(Example #1-5) Among the (successfully) received REQ_SIGs, a MAX_REPNUM number of the (successfully) received REQ_SIGs may be randomly selected.

Figure 8:
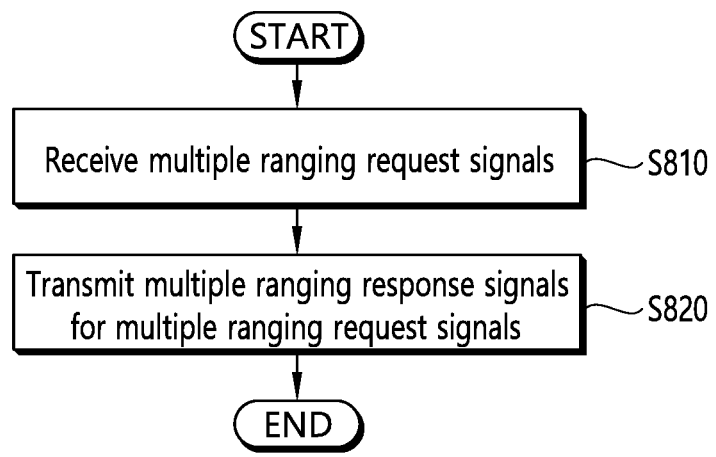
FIG. 8 shows a ranging method of a UE according to an embodiment of the present disclosure.

FIG. 8 shows a ranging method of a UE according to an embodiment of the present disclosure.

According to FIG. 8, a UE receives multiple ranging request signals (S810).

Thereafter, the UE transmits multiple ranging response signals for the multiple ranging request signals (S820). Herein, a number of the transmitted ranging response signals may be equal to or less than a maximum number of response signals. Additionally, herein, the maximum number of response signals may be determined based on a Channel Busy Ratio (CBR), which is measured by the UE. Meanwhile, herein, since detailed examples being related to the maximum number of response signals are the same as described above, overlapping descriptions will be omitted.

Figure 9:
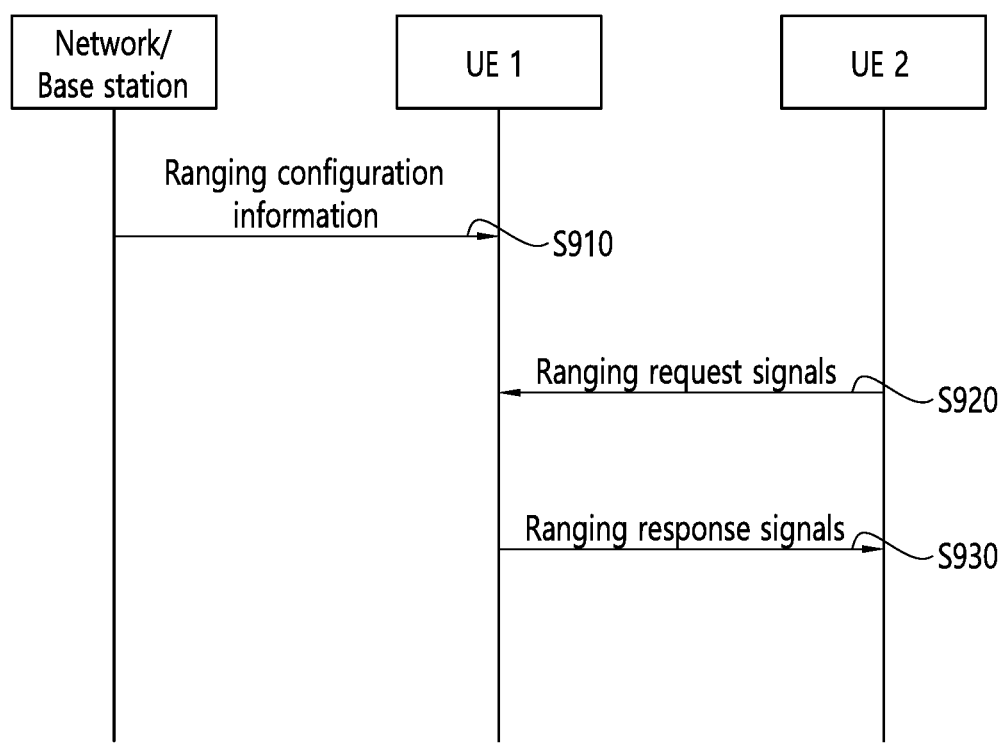
FIG. 9 shows a ranging method of a UE according to an embodiment of the present disclosure while considering a network.

FIG. 9 shows a ranging method of a UE according to an embodiment of the present disclosure while considering a network.

According to FIG. 9, a network or base station transmits ranging configuration information to UE 1 (S910). Herein, the ranging configuration information may include information on a maximum number of response signals or information on a relationship between the CBR and the maximum number of response signals. Additionally, herein, the ranging configuration information may further include a maximum allowed transmission power, a number of retransmissions, an allowed transmission resource size, an allowed range of link adaptation parameter, and a maximum CR ratio for the response signal.

Thereafter, UE 1 receives ranging request signals from UE 2 (S920). Herein, although a case of receiving ranging request signals from one UE is assumed in FIG. 9, UE 1 may also receive each of the ranging request signals from multiple UEs.

Afterwards, UE 1 transmits ranging response signal to UE 2 based on the ranging configuration information (S930). Herein, a ranging request signal transmitted by UE 2 may be the ranging request signals that is to be transmitted at a higher priority within a range of the above-described maximum number of response signals. Since a detailed example of this process is the same as the above-described example, overlapping description will be omitted.

Figure 10:
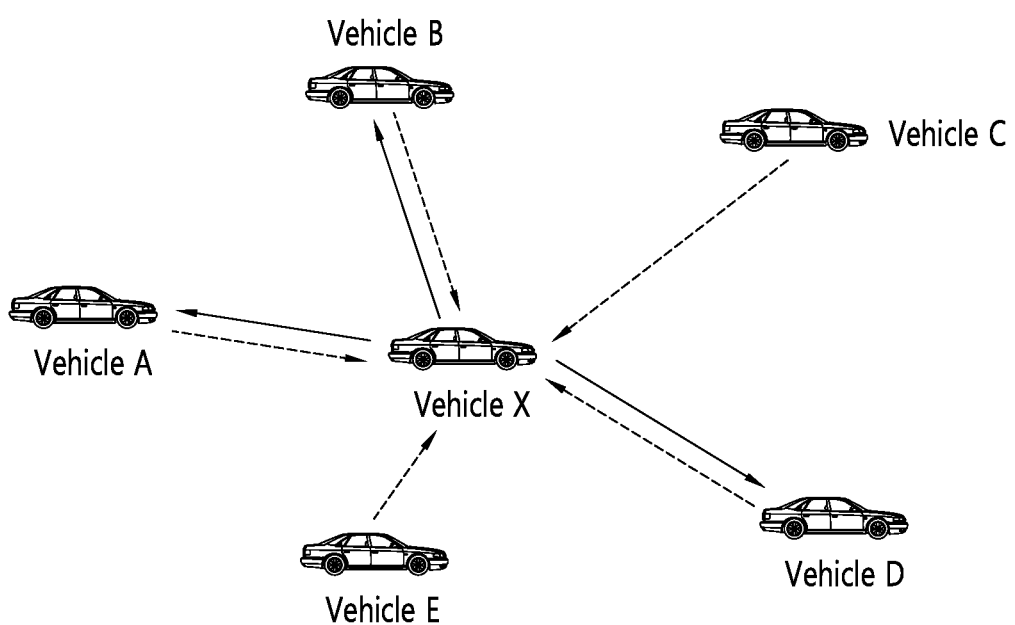
FIG. 10 shows a detailed example applying an embodiment of the present disclosure.

FIG. 10 shows a detailed example applying an embodiment of the present disclosure.

FIG. 10 assumes a situation where Vehicle X has received ranging request signals from each of Vehicle A, Vehicle B, Vehicle C, Vehicle D, and Vehicle E.

Herein, the maximum number of response signals of Vehicle X may be determined based on a CBR measured by Vehicle X. Herein, for example, based on the CBR measured by Vehicle X, the maximum number of response signals for Vehicle X may be configured to be equal to 3. Meanwhile, herein, by appropriately adjusting the maximum number of response signals load control may be adaptively performed in accordance with the level of congestion.

In such case, for the ranging request signals received from each of Vehicle A to Vehicle E, Vehicle X shall decide for which vehicle(s) the ranging response signal is to be transmitted at a higher priority. More specifically, Vehicle X shall select 3 vehicles to which it will be transmitting the ranging response signals.

Herein, Vehicle A, each of the ranging request signals transmitted by Vehicle A, Vehicle B, and Vehicle D may correspond to one of the above-described (Example #1-1) to (Example #1-5). For example, each of the ranging request signals transmitted by Vehicle A, Vehicle B, and Vehicle D may have a reception power greater than or equal to a predetermined threshold value, and each of the ranging request signals transmitted by Vehicle C and Vehicle E may have a reception power lower than the predetermined threshold value.

In such case, Vehicle X may transmit ranging response signals for each of Vehicle A, Vehicle B, and Vehicle D at a higher priority, and Vehicle X may not transmit any ranging response signal for Vehicle C and Vehicle E. By using this method, load control related to the ranging may be performed.

[Proposed Method #2] If the density (or CBR measurement value (related to a ranging signal)) of a wireless communication device (e.g., vehicle) is high (or higher (or greater) that a predetermined threshold value), a "Ranging Distance" may be decreased by performing transmission power decrease related to the ranging signal (e.g., REQ_SIG or REP_SIG) and/or transmission resource size decrease (and/or number of retransmissions decrease), and so on.

In other words, in case the level of congestion is high, or in case the density of neighboring UEs is high, performing the ranging operation by using a high transmission power may increase only the overall interference of the system. In order to prevent such situation from occurring, as described above, load/interference control may be performed by adjusting the ranging distance. Herein, ranging distance adjustment means that when a transmitting UE adjusts transmission power of a ranging request signal, a distance range of the receiving UE/a number of receiving UEs receiving the ranging request signal may be relatively decreased, and, as a result, a range performing ranging or the ranging operation may be adjusted. Thus, it may be possible to perform an efficient ranging operation, while considering a level of congestion or density of UEs.

Meanwhile, resources for ranging signals, most particularly, ranging response signals being transmitted by the receiving UE may be adjusted by the transmitting UE transmitting ranging request signals. More specifically, according to the number of receiving UEs performing the ranging operation or the density of UEs existing in the neighboring area of the transmitting UE, a channel occupancy ratio or level of congestion measured by the transmitting UE, the transmitting UE may adaptively and appropriately determine the transmission resource size of the ranging response signals. And, by doing so, a more efficient resource management may be possible.

Hereinafter, most particularly, for the transmitting UE, a method for performing congestion control and load control by adjusting transmission power of the ranging signals and/or transmission resource size for the ranging signals will be proposed.

Herein, for example, the density of wireless communication devices (existing in the neighboring area or valid distance (for ranging)) may be (coarsely) determined through a pre-defined channel (or message) (e.g., Cooperative Awareness Message (CAM), Discovery, and so on).

Herein, for example, in the present disclosure, the term "CBR" may be interpreted as at least one of (the above-described) "REQ_SIG (specific) CBR", "REP_SIG (specific) CBR", and "ranging signal (specific) CBR".

Herein, as another example, a maximum (allowed) transmission power, and/or a number of (allowed) retransmissions, and/or an (allowed) amount (or size) of transmission resources, and/or (allowed) range of link adaptation parameters (e.g., MCS), and/or maximum (allowed) CR ratio, and/or (allowed) latency, and so on, being related to ranging signals (e.g., REQ_SIG or REP_SIG) per (measured) CBR value (range) may be (differently or independently) pre-determined in advance.

As another example, if a wireless communication device (e.g., vehicle) speed is low (or lower than a predetermined threshold value), (a ranging operation based on) a relatively long latency may be allowed.

In other words, in case of a vehicle, for example, when the speed of a wireless communication device on a road is relatively low, the chance (or likelihood) of a distance between vehicles not being changed dynamically may be high, or the chance of a large number of vehicles existing near the wireless communication device may be high. Therefore, under the corresponding environment, for the ranging operation, allowing a relatively long latency may be considered. By using this method, the ranging operation allowing a relatively long latency may balance (or disperse) the transmission amount (or size) of the ranging signals on the time domain, and, as a result, at a specific time point, an effect of reducing an average channel occupancy ratio of the ranging signals may be gained.

As another example, in case (a predetermined number (or density) or more of) wireless communication devices (e.g., receiver) (existing in the neighboring area or valid distance (for ranging)) do not exist (e.g., this may be determine through a pre-defined channel (or message) (e.g., CAM, discovery, and so on)), the wireless communication devise (e.g., receiver) may be configured not to perform ranging signal transmission (e.g., REQ_SIG).

[Proposed Method #3] For example, a size (or number of) REP_SIG resources (e.g., this may be (extendedly) interpreted as a type of feedback channel resource) may be adjusted (by the transmitter) based on a level of congestion (or load level) (or CBR measurement value), and so on (after determining a number (or density) of target receivers (existing in the neighboring area or valid distance (for ranging)).

In other words, for the transmitting UE, in case a large number of UEs being the ranging targets exist in the neighboring area, the transmitting UE itself has a larger number of ranging response signals that are to be received. In such case, a method of allocating, by the transmitting UE, a large size (or number) of resources being used for the ranging response signals may be considered. More specifically, the transmitting UE may be capable of adjusting the resource size being used for the ranging response signal transmission of the receiving UE.

Herein, for example, as the level of congestion(/load level) (or CBR measurement value) becomes higher, a larger (or smaller) size (or number) of REP_SIG resources may be allocated.

As another example, in case a pre-defined specific (type of) wireless communication device (e.g., RSU, base station) performs adjustment (or re-configuration) of the amount (or number) of REP_SIG resources, a UE (or transmitter/receiver) may be configured to report the measured level of congestion(/load level) (or CBR) information through a channel (of the corresponding purpose).

As another example, updated REP_SIG resource information may be signaled (via broadcast) to the wireless communication device (e.g., (neighboring) receiver (and/or transmitter)) through a channel (of the corresponding purpose), which is pre-defined (by the transmitter or specific (type of) wireless communication device).

As another example, another wireless communication device (e.g., UE, RSU, and so on) (existing in the neighboring area or valid distance (for ranging)) may notify the need for an increase and/or decrease of the size (or number) of REP_SIG resources, through a pre-defined channel (of the corresponding purpose).

Figure 11:
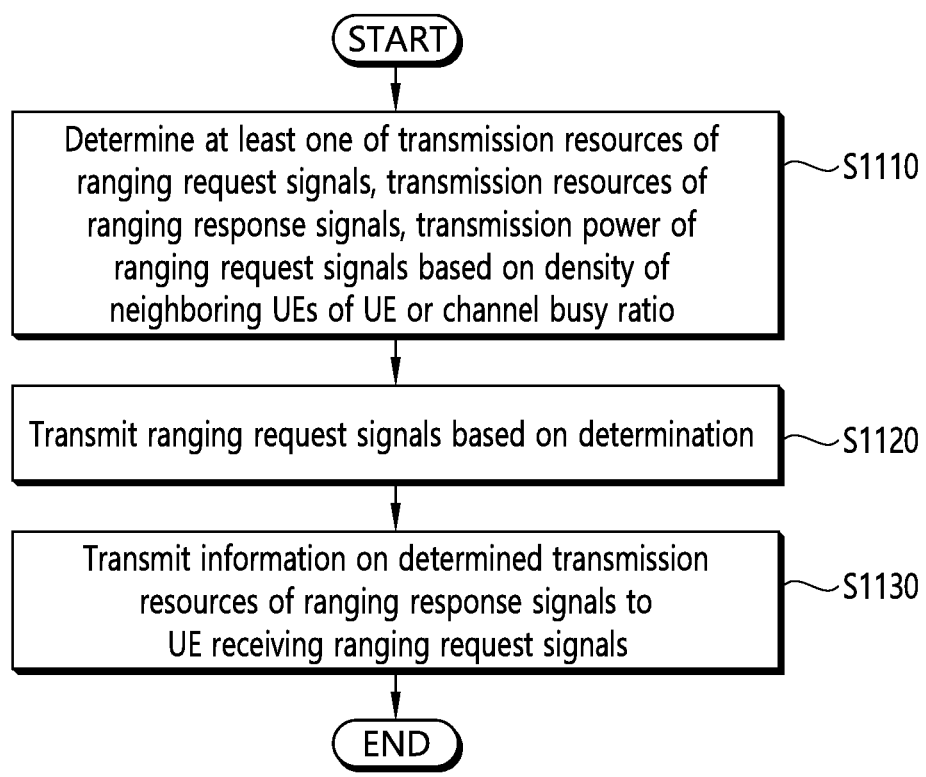
FIG. 11 shows a ranging method of a UE according to another embodiment of the present disclosure.

FIG. 11 shows a ranging method of a UE according to another embodiment of the present disclosure.

According to FIG. 11, a UE determines at least one of transmission resources of ranging request signals, transmission resources of ranging response signals, and transmission power of ranging request signals, based on the density or Channel Busy Ratio (CBR) of UEs existing in the neighboring area of the UE (S1110). Herein, as at least one of the density or CBR of UEs existing in the neighboring area of the UE becomes relatively high, the UE may determine a relatively smaller size of transmission resources for the ranging request signals or a relatively lower transmission power for the ranging request signals. More specifically, in such situation, the transmitting UE may determine an even smaller size of transmission resources or an even lower transmission power for the ranging request signals being transmitted by the corresponding transmitting UE itself.

Additionally, herein, as at least one of the density or CBR of UEs existing in the neighboring area of the UE becomes relatively high, the UE may determine a relatively larger size of transmission resources for the ranging request signals. More specifically, in such situation, the transmitting UE may determine an even larger size of transmission resources for the ranging response signals being transmitted by the receiving UE. Additionally, herein, in case the density of the UE existing in the neighboring area of the UE is lower than a predetermined threshold value, the ranging request signals may not be transmitted, and the ranging request signals may be transmitted only in the case where the density is greater than the predetermined threshold value. Additionally, herein, the CBR may be a value measured by another UE that is received by the UE.

Thereafter, the UE transmits ranging request signals based on the determined result (S1120).

Afterwards, the UE transmits information on the determined transmission resources for the ranging response signals to a UE receiving the ranging request signals (S1130). Herein, it may be possible to apply the determined transmission resources for the ranging response signals to the UE receiving the ranging request signals. Additionally, herein, the information may be transmitted via broadcast. Additionally, herein, the information may be transmitted through a pre-defined channel.

Meanwhile, FIG. 11 and the descriptions related to FIG. 11 disclose a structure transmitting information on the determined transmission resources for the ranging response signals after transmitting the ranging request signals, it will be apparent that the ranging request signals and the transmission order of the information may be different from FIG. 11. Additionally, the ranging request signals and the information may be synchronously transmitted.

Figure 12:
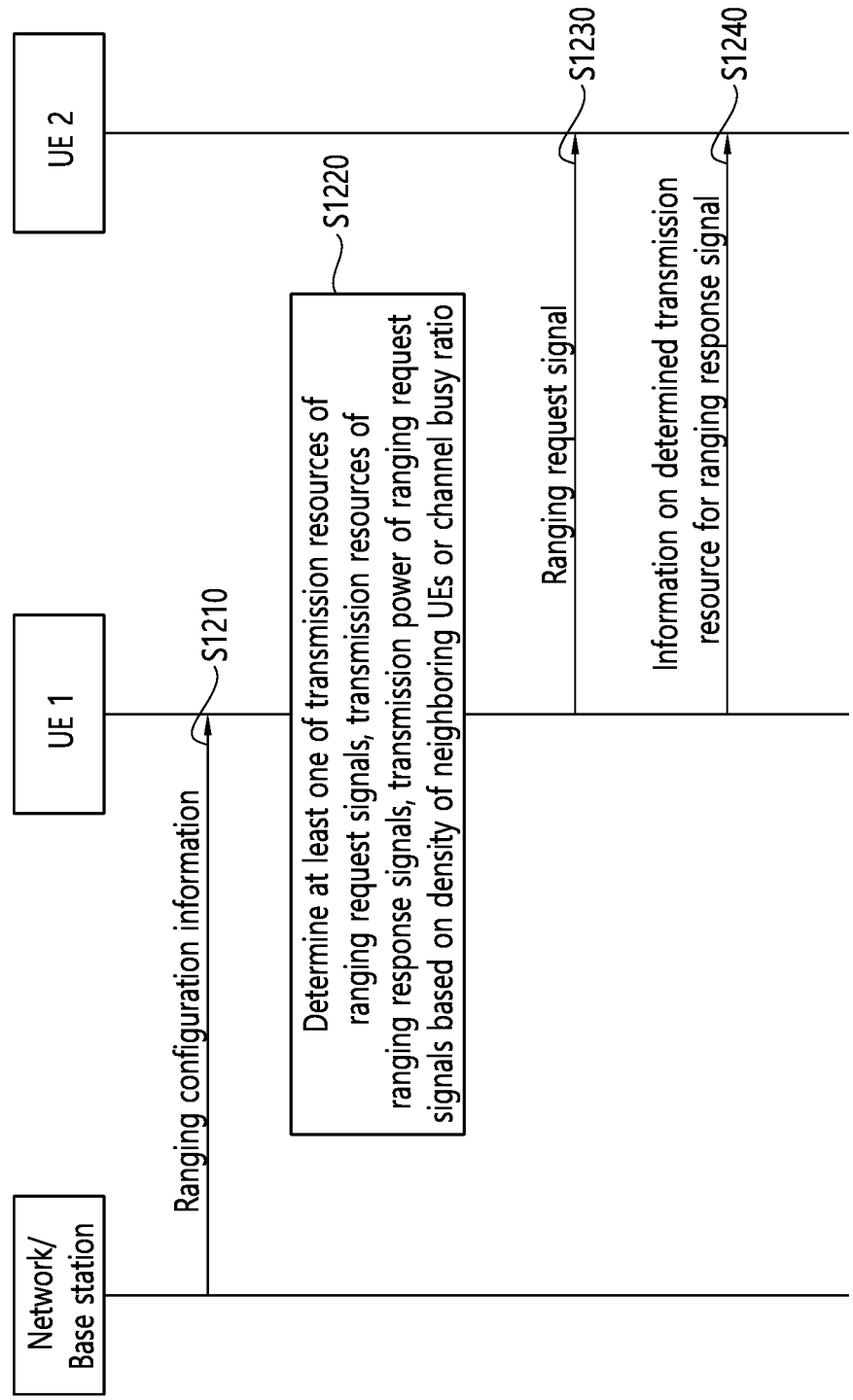
FIG. 12 shows a ranging method of a UE according to another embodiment of the present disclosure while considering a network.

FIG. 12 shows a ranging method of a UE according to another embodiment of the present disclosure while considering a network.

According to FIG. 12, a network or base station transmits ranging configuration information to UE 1 (S1210). Herein, the ranging configuration information may include information needed by UE 1 to perform the ranging operation (e.g., a relationship between a predetermined CBR value and a transmission power/transmission resources of a ranging signal, a channel that is to transmit information on predetermined transmission resources of determined ranging response signals, and so on).

Thereafter, UE 1 determines at least one of transmission resources of ranging request signals, transmission resources of ranging response signals, and transmission power of ranging request signals, based on at least one of density or Channel Busy Ratio (CBR) of UEs existing in the neighboring area of UE 1 (S1220). Herein, since detailed examples being related to the density or CBR of the neighboring UEs are the same as described above, overlapping descriptions will be omitted.

Subsequently, UE 1 transmits ranging request signals to UE 2 based on the determined result (S1230).

Afterwards, UE 1 transmits information on the determines transmission resources of the ranging response signals to UE 2 (S1240). Herein, although it is not separately shown in the drawing, in case UE 2 transmits the ranging response signals to UE 1, the ranging response signals may be transmitted based on the aforementioned information. More specifically, UE 2 may transmit the ranging response signals based on the aforementioned information by using the determined transmission resources of the ranging response signals.

Figure 13:
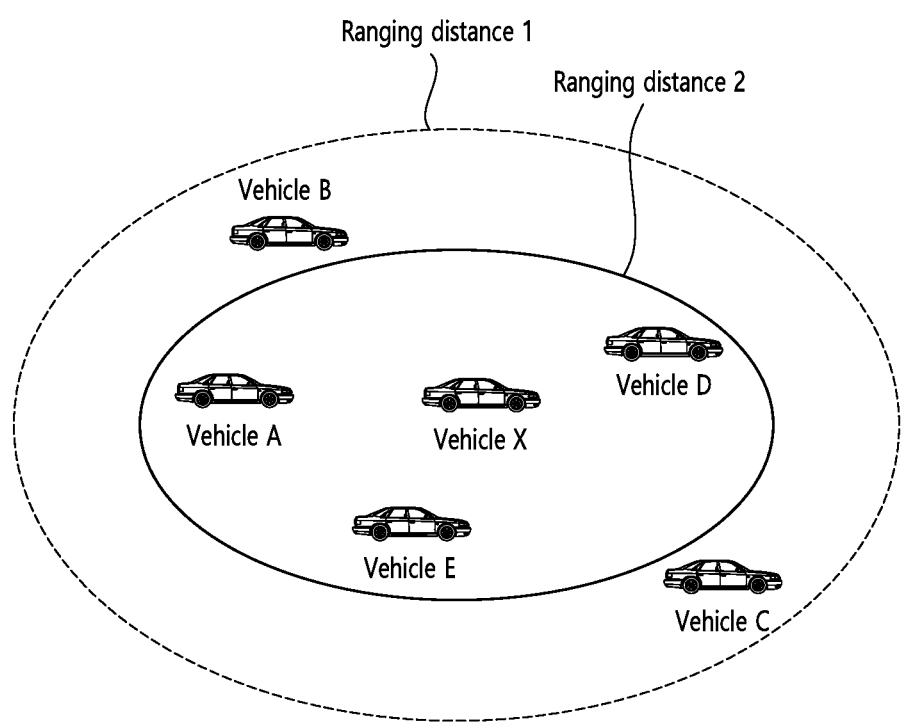
FIG. 13 shows a detailed example applying another embodiment of the present disclosure.

FIG. 13 shows a detailed example applying another embodiment of the present disclosure.

FIG. 13 assumes a situation where Vehicle X intends to transmit ranging request signals to each of Vehicle A to Vehicle E. Herein, a ranging distance currently considered by Vehicle X may be Ranging Distance 1 of FIG. 13. In other words, based on the density or level of congestion of wireless communication devices measured by Vehicle X at a specific time point, a ranging distance that has been determined to enable the ranging operation to be (successfully or stably) performed may be Ranging Distance 1 of FIG. 13. Therefore, Vehicle X may transmit ranging request signals to all of Vehicle A to Vehicle E, which are included in Ranging Distance 1, as its targets.

Herein, a situation where the density or level of congestion of wireless communication devices increases may occur. In such case, Vehicle X may adjust the target ranging distance according to which the ranging operation is being performed to Ranging Distance 2. More specifically, Vehicle X may adjust the transmission power of the ranging request signals it intends to transmit so that Vehicle B and Vehicle C, which are included in Ranging Distance 1 but not included in Ranging Distance 2, cannot receive the ranging request signals, or so that Vehicle B and Vehicle C cannot transmit ranging response signals. Since a detailed example of the same is as described above, overlapping descriptions will be omitted.

Additionally, herein, based on the level of congestion measured by Vehicle X, Vehicle X may determine the transmission resource of ranging signals and/or the transmission power of ranging signals for Vehicle A to Vehicle E and may, then, transmit information on the determined result. Thereafter, when Vehicle A to Vehicle E transmit ranging response signals to Vehicle X, Vehicle X may instruct Vehicle A to Vehicle E to transmit the ranging response signals based on the transmitted information. Since a detailed example of the same is as described above, overlapping descriptions will be omitted.

Since examples of the above-described proposed methods may also be included as one of the implementation methods of the present description, it will be apparent that the examples of the above-described proposed methods may be viewed as part of the proposed methods. Additionally, although the above-described proposed methods may be implemented independently, the above-described proposed methods may also be implemented as a form of combination (or integration) of some of the proposed methods.

For example, although the proposed methods are described based on a 3GPP system for simplicity in the description of the present description, the scope of the system in which the proposed methods can be applied may also be extendedly applied to other systems apart from the 3GPP system.

For example, (part of) the proposed methods of the present disclosure may also be extendedly applied for D2D communication. Herein, for example, D2D communication refers to performing communication by a UE with another UE by using a direct radio channel, and, herein, for example, although a UE refers to a user terminal, in case a network equipment, such as a base station, transmits/receives signals in accordance with a communication method between UEs, the base station may also be considered as a type of UE.

For example, (part of) the proposed methods of the present disclosure will not be limited only to the direct communication between UEs and may also be used in uplink and downlink, and, at this point, a base station or a relay node, and so on, may use the proposed method.

For example, information indicating the application or non-application of the proposed methods (or information on the rules of the proposed methods) of the present disclosure may be defined to be notified to a UE by the base station or to a receiving UE by a transmitting UE, via pre-defined signaling (e.g., physical layer signaling or higher layer signaling).

For example, (part of) the proposed methods of the present disclosure may also be limitedly applied to MODE #3 operations (e.g., a mode signaling(/controlling) scheduling information related to V2X message transmission(/reception) by the base station) and/or MODE #4 operations (e.g., a mode (independently) signaling(/controlling) scheduling information related to V2X message transmission(/reception) by the UE).

For example, (part of) the proposed methods of the present disclosure may be extendedly applied to a case where load (or congestion) control related to ranging signals is not performed(/applied).

Figure 14:
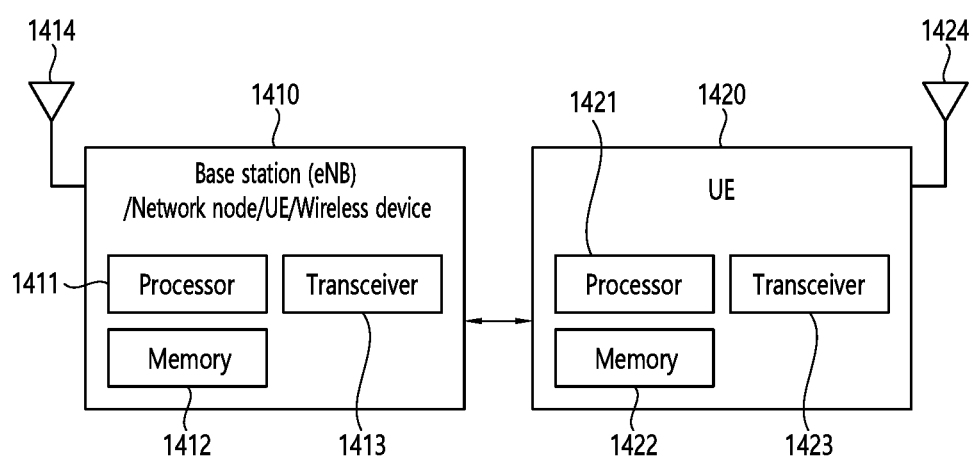
FIG. 14 is a block diagram showing an example of a wireless communication device according to an embodiment of the present disclosure.

FIG. 14 is a block diagram showing an example of a wireless communication device according to an embodiment of the present disclosure.

Referring to the example of FIG. 14, a wireless communication system may include a base station (1410) and a UE (1420). The UE (1420) may be located in an area of the base station (1410). In some scenarios, the wireless communication system may include multiple UEs. In the example of FIG. 14, although the base station (1410) and the UE (1420) are shown as an example, the present disclosure will not be limited only to this. For example, the base station (1410) may be replaced with another network node, UE, wireless device, or another similar device.

The base station and the UE may each be indicated as a wireless communication device or wireless device. The base station of FIG. 14 may be replaced with a network node, a wireless device, or a UE.

The base station (1410) includes at least one or more processors, such as processor(s) (1411), at least one or more memories, such as memory(s) (1412), and at least one or more transceivers, such as transceiver(s) (1413). The processor(s) (1411) may implement functions, procedures, and/or methods shown in FIG. 8 to FIG. 13. The processor(s) (1411) may implement one or more protocols. For example, the processor(s) (1411) may implement one or more layers (e.g., functional layers) of a radio interface protocol. The memory(s) (1412) may be connected to the processor(s) (1411) and may store various forms of information and/or instructions. The transceiver(s) (1413) may be connected to the processor(s) (1411) and may be controlled so as to transceive radio signals.

The UE (1420) includes at least one or more processors, such as processor(s) (1421), at least one or more memories, such as memory(s) (1422), and at least one or more transceivers, such as transceiver(s) (1423).

The processor(s) (1421) may implement functions, procedures, and/or methods shown in FIG. 8 to FIG. 13. The processor(s) (1421) may implement one or more protocols. For example, the processor(s) (1421) may implement one or more layers (e.g., functional layers) of a radio interface protocol. The memory(s) (1422) may be connected to the processor(s) (1421) and may store various forms of information and/or instructions. The transceiver(s) (1423) may be connected to the processor(s) (1421) and may be controlled so as to transceive radio signals.

The memory(s) (1412) and/or the memory(s) (1422) may each be connected to the processor(s) (1411) and/or the processor(s) (1421) from the inside or the outside, or may each be connected to another processor through various technologies, such as wired or wireless connections.

The base station (1410) and/or the UE (1420) may have at least one or more antennas. For example, the antenna(s) (1414) and/or the antenna(s) (1424) may be configured to transceive radio signals.

Figure 15:
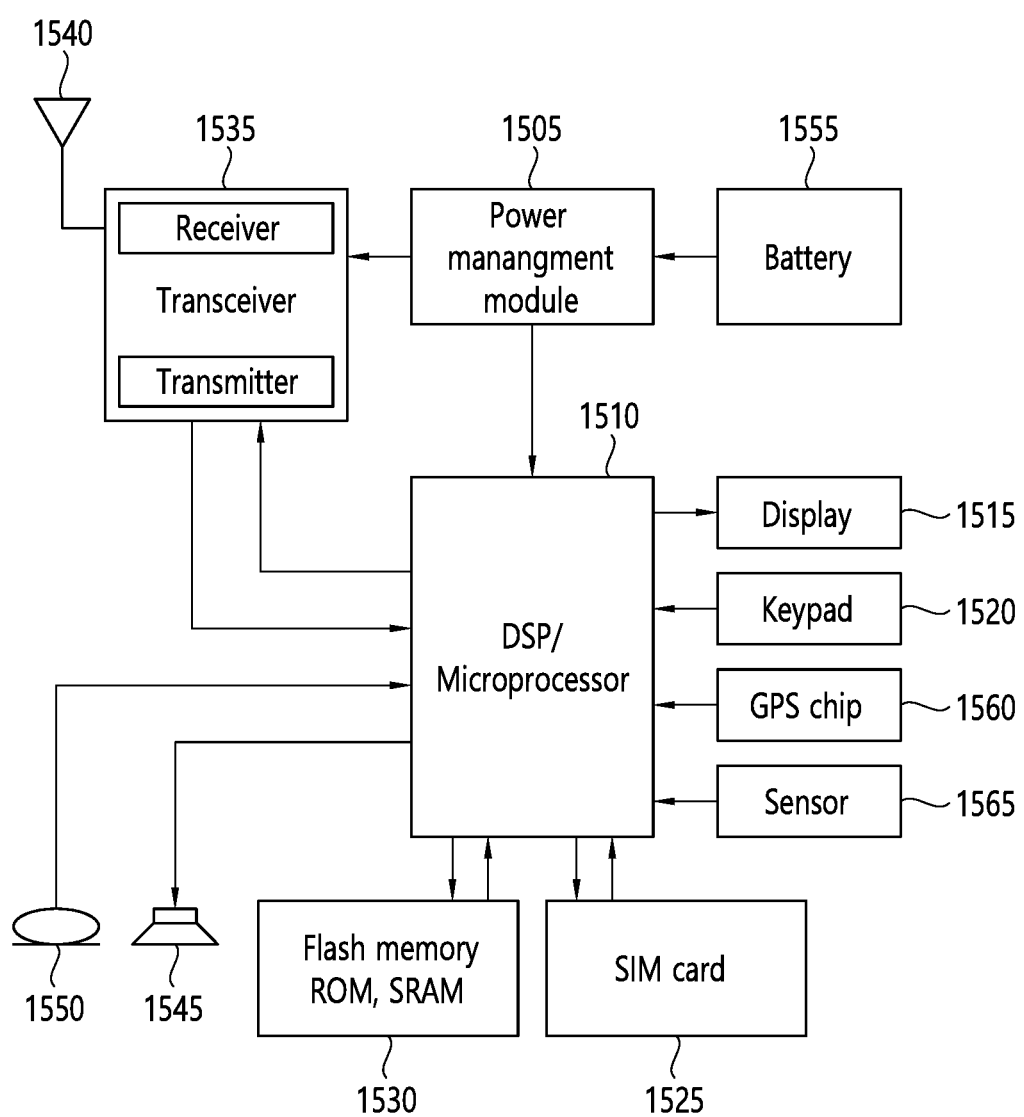
FIG. 15 shows an example of a wireless communication device realizing the embodiment of the present disclosure.

FIG. 15 shows an example of a wireless communication device realizing the embodiment of the present disclosure.

Most particularly, FIG. 15 is a diagram showing a more detailed example of the UE (1420) of FIG. 14. The UE may be a random appropriate mobile computer device, which is configured to perform at least one or more implementations of the present disclosure, such as a vehicle communication system or device, a wearable device, a portable computer, a smartphone, and so on.

Referring to the example of FIG. 15, the UE may include at least one or more processors, such as processor(s) (1510), (e.g., DSP or microprocessor), a transceiver (1535), a power management module (1505), an antenna (1540), a battery (1555), a display (1515), a keypad (1520), a global positioning system (GPS) (or satellite navigation system) chip (1560) and sensor (1565), a memory (1530), a subscriber identification module (SIM) card (1525) (optional), speakers (1545), and a microphone (1550). The UE may include one or more antennas.

The processor (1510) may be configured to implement functions, procedures, and/or methods shown in FIG. 8 to FIG. 13. According to the exemplary implementation, the processor (1510) may perform (or implement) one or more protocols, such as layers (e.g., functional layers) of a radio interface protocol.

The memory (1530) may be connected to the processor (1510) and may store information related to the operation of the processor. The memory may be located in the inside or on the outside of the processor and may be connected to another processor through various technologies, such as wired or wireless connections.

A user may press buttons of the keypad (1520) or use various technologies, such as voice activation by using the microphone (1550), so as to input various forms of information (e.g., instruction information, such as telephone numbers). The processor receives and processes user information and performs appropriate functions, such as making a phone call by using a telephone number. For example, in order to perform various functions, data (e.g., operation data) may be searched from the SIM card (1525) or the memory (1530). As another example, in order to perform functions related to the location (or position) of a device, such as vehicle navigation, map service, and so on, GPS information may be received from the GPS chip (1560) and then processed. As another example, the processor may mark various forms of information and data on the display (1515) for referential usage or convenience of the user.

The transceiver (1535) is connected to the processor and transceives radio signals, such as radio frequency (RF) signals. The processor may control the transceiver so that the transceiver can initiate communication and transmit radio signals including various types of information or data, such as voice communication data. The transceiver includes one receiver and one transmitter in order to transmit or receive radio signals. The antenna (1540) facilitates the transception of the radio signals. According to the exemplary implementation, when receiving radio signals, in order to process signals by using the processor, the transceiver may forward and convert the signals to a baseband frequency. The processed signals may be processed according to various technologies, such as being converted to audible information so as to be outputted through the speakers (1545) or to readable information.

According to the exemplary implementation, the sensor (1565) may include one or more detection device being configured to discover various forms of information including speed, acceleration, light, oscillation, accessibility, location, image, and so on, but not being limited by the same. The processor may receive sensor information, which is obtained by the sensor, and process the obtained sensor information, and the processor may perform various forms of functions, such as collision prevention, automatic driving (or self-driving), and so on.

In the example of FIG. 15, various configuration elements (e.g., camera, USB port, and so on) may be further included in the UE. For example, a camera may be connected to the processor and may be used for various services, such as automatic driving (or self-driving), vehicle safety services, and so on.

As described above, FIG. 15 is merely an example of the UE, and its implementation shall not be limited only to this. For example, some of the configuration elements (e.g., the keypad (1520), the GPS chip (1560), the sensor (1565), the speakers (1545), and/or the microphone (1550)) may not be implemented in some scenarios.

Figure 16:
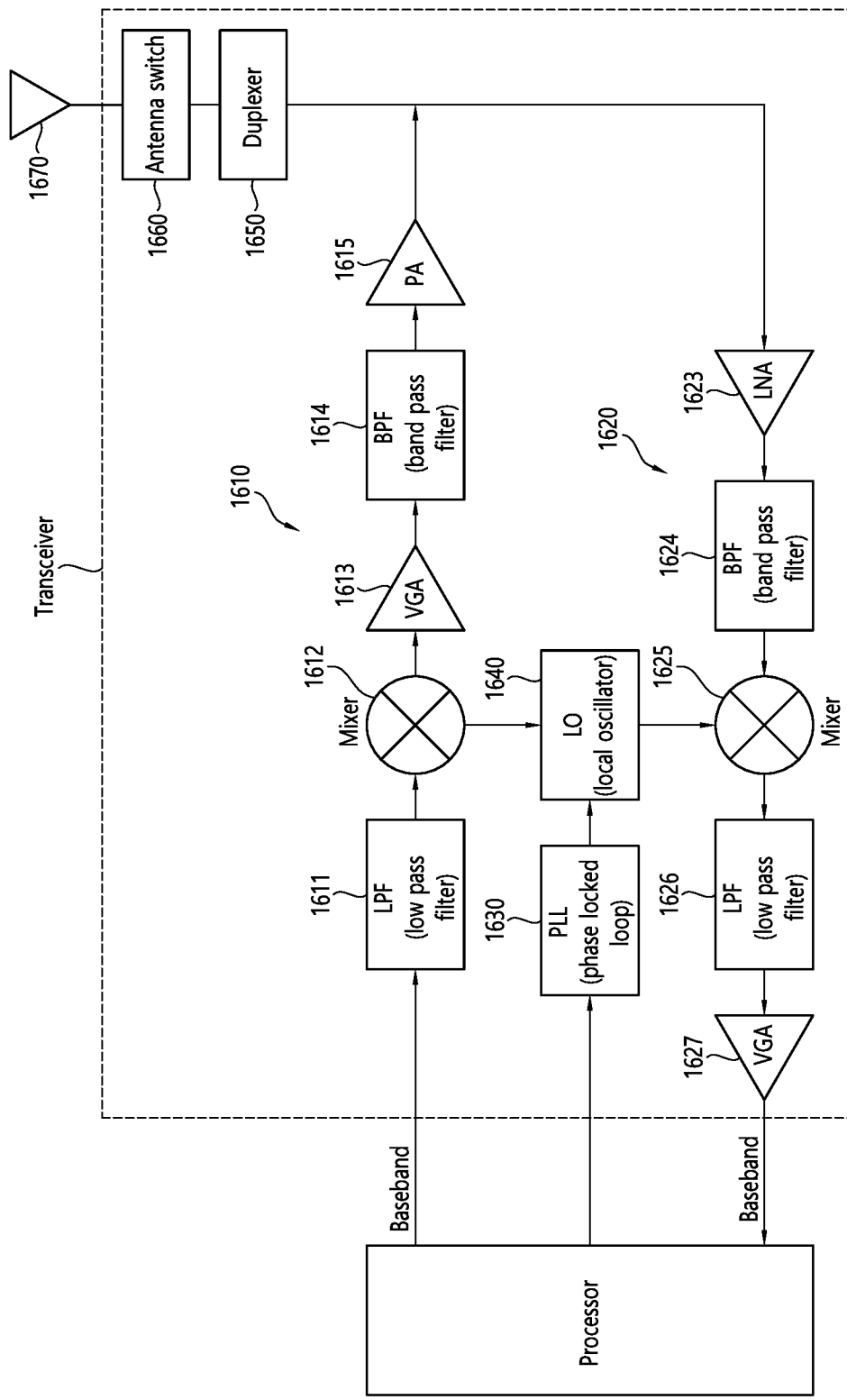
FIG. 16 shows an example of a transceiver of a wireless communication device according to an embodiment of the present disclosure.

FIG. 16 shows an example of a transceiver of a wireless communication device according to an embodiment of the present disclosure.

Most particularly, FIG. 16 shows an example of a transceiver that may be implemented in a frequency division duplex (FDD) system.

In a transmission path, as shown in the processor(s) described in FIG. 14 and FIG. 15, at least one processor may perform processing so as to allow data to be transmitted and may transmit signals, such as analog output signals, to the transceiver (1610).

In the aforementioned example, in the transceiver (1610), an analog output signal is, for example, filtered by a low-pass filter (LPF) (1611) in order to remove noise caused by a previously performed digital-to-analog conversion (ADC), up-converted by an up-converter (e.g., mixer) (1612) from baseband to RF, and amplified by a variable gain amplifier (VGA) (1613). The amplified signal is filtered by a filter (1614), amplified by a power amplifier (PA) (1615), routed through duplexer(s) (1650)/antenna switch(es) (1660), and transmitted through an antenna (1670).

In a reception path, the antenna (1670) receives signals in a radio environment, and the received signals are routed by the duplexer(s) (1650)/antenna switch(es) (1660) and, then, transmitted to the receiver (1620).

In the above-described example, a signal received by the receiver (1620) is amplified by an amplifier, such as a low noise amplifier (LNA) (1623), filtered by a band-pass filter (1624), and down-converted from RF to baseband by a down-converter (e.g., mixer) (1625).

The down-converted signals is filtered by a low-pass filter (LPF) (1626), amplified by an amplifier, such as a VGA (1627), in order to obtain an analog input signal, and, then, the analog input signal is provided to one or more processors, such as the processor(s) shown in FIG. 14 and FIG. 15.

Furthermore, a local oscillator (LO) (1640) generates transceptions of a LO signal and sends each of the transceptions to the up-converter (1612) and the down-converter (1625).

In some implementations, a phase locked loop (PLL) (1630) may receive control information from the processor and may transmit control signals to an LO generator (1640) in order to generate transception of LO signals from an appropriate frequency.

Implementations shall not be limited to the specific alignment (or positioning) shown in FIG. 16, and various configuration elements and circuits may be aligned (or positioned) differently from the example shown in FIG. 16.

Figure 17:
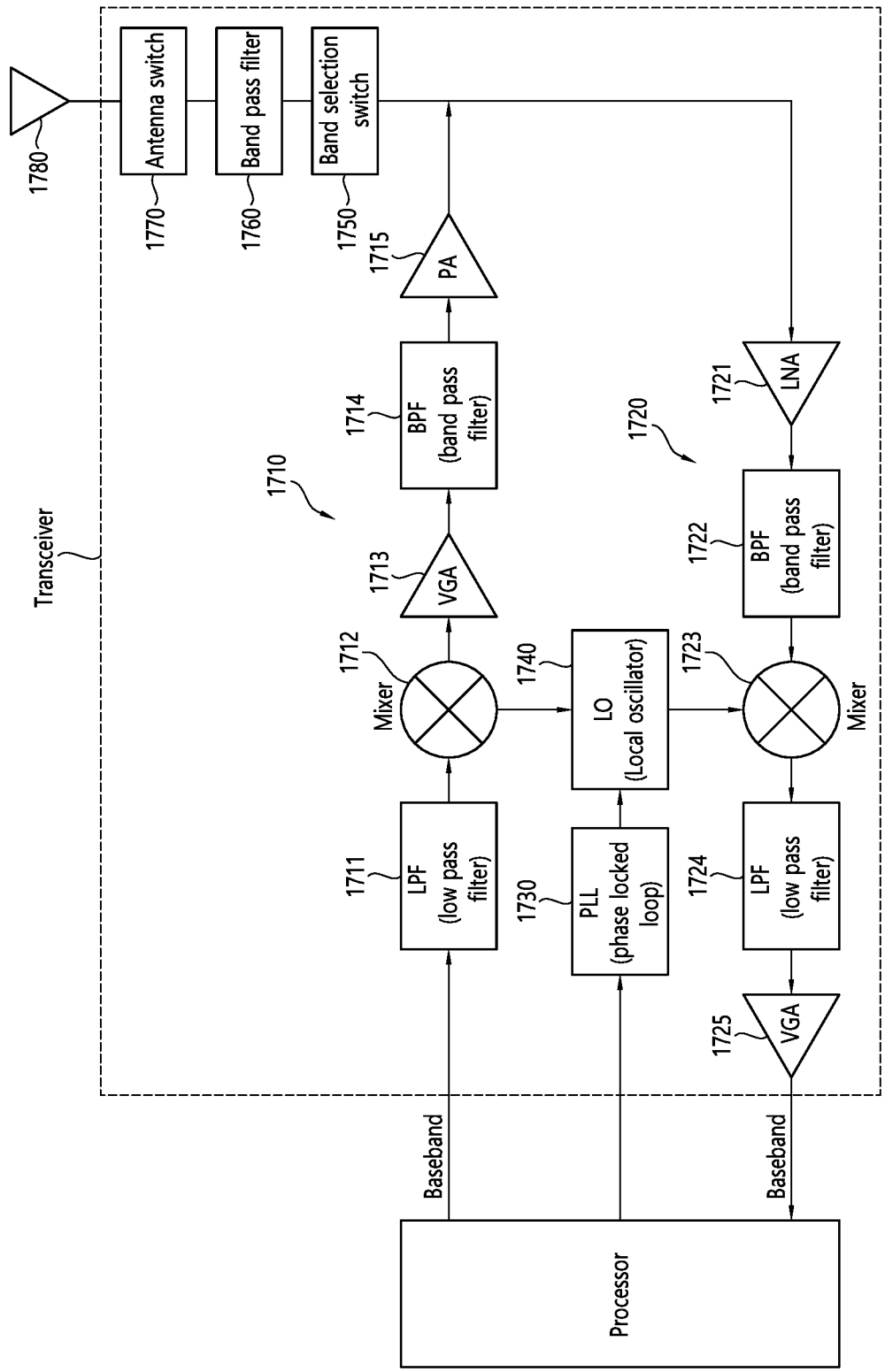
FIG. 17 shows another example of a transceiver of a wireless communication device according to an embodiment of the present disclosure.

FIG. 17 shows another example of a transceiver of a wireless communication device according to an embodiment of the present disclosure.

Most particularly, FIG. 16 shows an example of a transceiver that may be implemented in a time division duplex (TDD) system.

According to the implantation example, a transmitter (1710) and a receiver (1720) of the transceiver of a TDD system may have one or more similar characteristics as the transmitter and receiver of the transceiver of the FDD system.

Hereinafter, a structure of a transceiver of a TDD system will be described.

In a transmission path, a signal being amplified by a power amplifier (PA) (1715) of the transmitter is routed through a band selection switch (1750), a band-pass filter (BPF) (1760), and antenna switch(es) (1770) and, then, transmitted to an antenna (1780).

In a reception path, the antenna (1780) receives signals from a radio environment, and the received signals are routed through the antenna switch(es) (1770), the band-pass filter (BPF) (1760), and the band selection switch (1750), and, then, the routed signals are provided to the receiver (1720).

Figure 18:
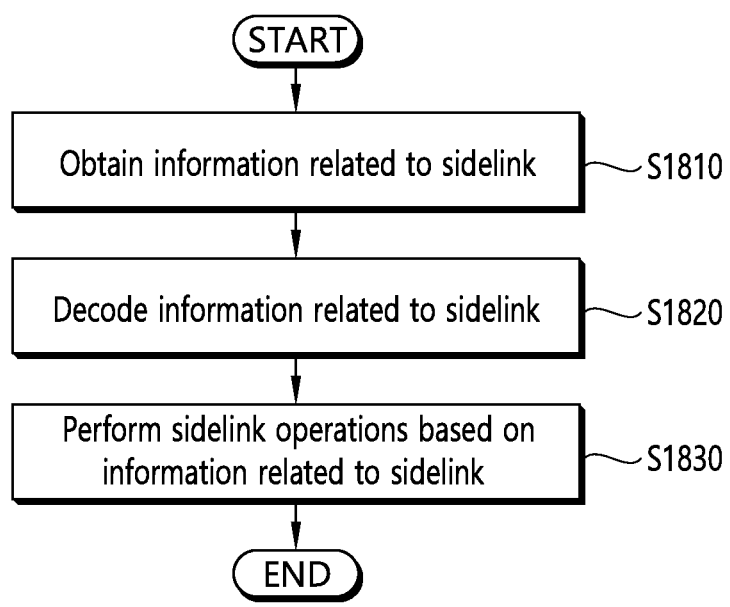
FIG. 18 shows exemplary operations of a wireless device being related to sidelink communication.

FIG. 18 shows exemplary operations of a wireless device being related to sidelink communication.

The operations of the wireless device related to sidelink, which are described in FIG. 18, are merely exemplary, and sidelink operations using various technologies may be performed by the wireless device. Sidelink is a UE-to-UE interface for sidelink communication and/or sidelink discovery. Sidelink may correspond to a PC5 interface. In a broader meaning, sidelink operations may be the transception of information between UEs. Sidelink may deliver (or transport) various forms of information.

In the above-described example, the wireless device obtains information related to sidelink (S1810). The information related to sidelink may be obtained from another wireless device or from a network node.

After obtaining the information, the wireless device decodes the information related to sidelink (S1820).

After decoding the information related to sidelink, the wireless device performs one or more sidelink operations based on the information related to sidelink (S1830). Herein, the sidelink operation(s) performed by the wireless device may be one or more of the operations described herein.

Figure 19:
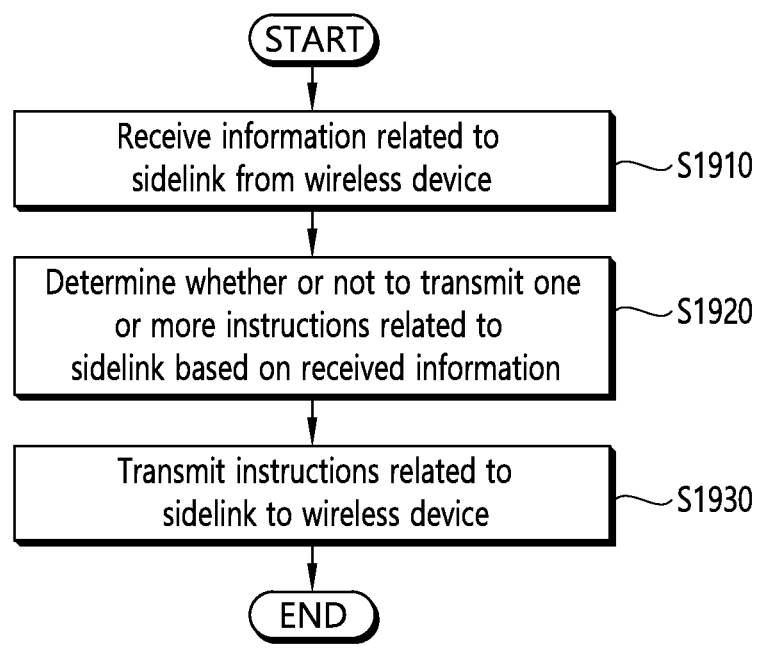
FIG. 19 shows exemplary operations of a network node being related to sidelink communication.

FIG. 19 shows exemplary operations of a network node being related to sidelink communication.

Network node operations related to sidelink, which are described in FIG. 19, are merely exemplary, and sidelink operations using various technologies may be performed by the network node.

The network node receives information related to sidelink from a wireless device (S1910). For example, the information related to sidelink may be 'SidelinkUEInformation', which is used for notifying (or informing) the sidelink information to the network node.

After receiving the information, the network node determines whether or not to transmit one or more instructions related to sidelink based on the received information (S1920).

According to the determined result of the network node for transmitting instructions, the network node transmits instruction(s) related to sidelink to the wireless device (S1930). According to the implementation example, after receiving the instructions transmitted from the network node, the wireless device may perform one or more sidelink operation(s) based on the received instruction(s).

Figure 20:
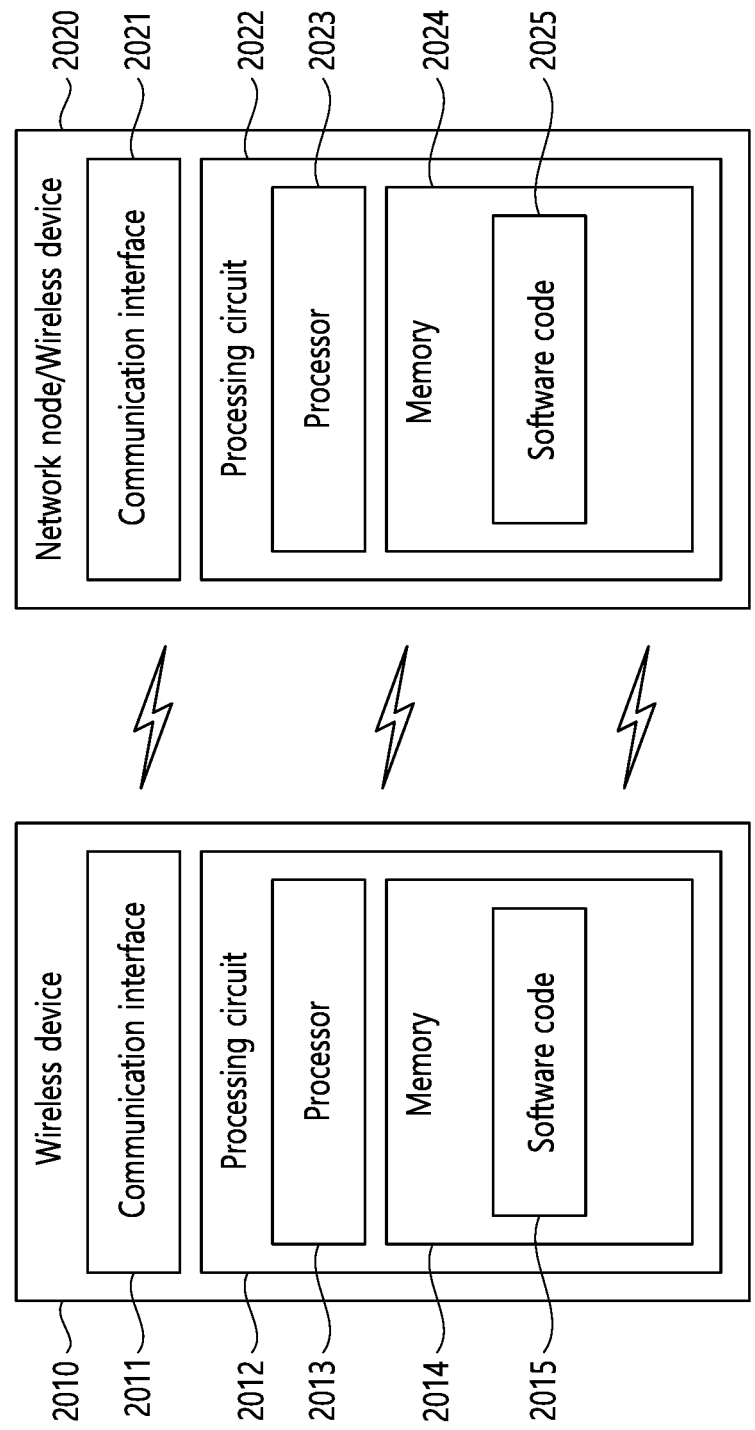
FIG. 20 is a block diagram shown an exemplary communication between a wireless device (2010) and a network node (2020).

FIG. 20 is a block diagram shown an exemplary communication between a wireless device (2010) and a network node (2020). The network node (2020) may be replaced with a wireless device or UE of FIG. 20.

In the above-described example, the wireless device (2010) includes a communication interface (2011) for communicating with one or more of other wireless device, network nodes, and/or other elements within the network. The communication interface (2011) may include one or more transmitters, one or more receivers, and/or one or more communication interfaces. The wireless device (2010) includes a processing circuit (2012). The processing circuit (2012) may include one or more processors, such as processor(s) (2013), and one or more memories, such as memory(s) (2014).

The processing circuit (2012) may be configured in order to control random methods and/or processes described in this specification, and/or, for example, in order to allow the wireless device (2010) to perform such methods and/or processes. The processor(s) (2013) corresponds to one or more processors for performing wireless device functions described in this specification. The wireless device (2010) includes a memory (2014) being configured to store program software codes and/or other information.

In one or more implementations, when one or more processors, such as processor(s) (2013), are operated, the memory (2014) is configured to store a software code (2015) including instructions enabling the processor (2013) to perform part or all of the processes, which are discussed in detail in relation with the implementation example described in FIG. 18 and this specification.

For example, as shown in the processor(s) (2013), in order to transceive information, one or more processors controlling one or more transceivers, such as the transceiver(s) (1423) of FIG. 14, may perform one or more processes related to the transception of information.

A network node (2020) includes a communication interface (2021) for communicating with one or more other network nodes, wireless devices, and/or other elements within the network. Herein, the communication interface (2021) includes one or more transmitters, one or more receivers, and/or one or more communication interfaces. The network node (2020) includes a processing circuit (2022). Herein, the processing circuit includes a processor (2023) and a memory (2024).

In multiple implementations, when one or more processors, such as processor(s) (2023), are operated, the memory (2024) is configured to store a software code (2025) including instructions enabling the processor (2023) to perform part or all of the processes, which are discussed in detail in relation with the implementation example described in FIG. 19 and this specification.

For example, as shown in the processor(s) (2023), in order to transceive information, one or more processors controlling one or more transceivers, such as the transceiver(s) (1413) of FIG. 14, may perform one or more processes related to the transception of information.

What is claimed is:

1. A method for measuring range in a wireless communication system, the method performed by a first user equipment (UE) and comprising:
receiving a first sidelink control information (SCI) format scheduling a first physical sidelink shared channel (PSSCH) from a second UE;
receiving multiple ranging request signals through the first PSSCH from the second UE;
transmitting a second SCI format scheduling a second PSSCH to the second UE; and
transmitting multiple ranging response signals for the multiple ranging request signals through the second PSSCH to the second UE,
wherein each of the first SCI format and the second SCI format comprises i) a priority field, ii) resource reservation field, iii) frequency resource location of initial transmission and retransmission field, iv) a time gap between initial transmission and retransmission field, v) modulation and coding scheme (MCS) field, vi) retransmission index field, and vii) reserved information bits,
wherein a number of the transmitted ranging response signals is less than or equal to a maximum number of response signals,
wherein the maximum number of response signals is determined based on a channel busy ratio (CBR) measured by the first UE,
wherein based on the CBR being measured for the second PSSCH in subframe n, wherein n is an integer, the CBR is a portion of sub-channels in a resource pool whose Sidelink Received Signal Strength Indicator (S-RSSI) measured by the first UE exceeds a configured threshold sensed over subframes [n−100, n−1], and
wherein, among the multiple ranging request signals received by the first UE, in a case where a number of successfully decoded ranging request signals is greater than the maximum number of response signals, ranging response signals for ranging request signals having a reception power relatively greater than a predetermined threshold value are transmitted.

2. The method of claim 1, wherein, in addition to the maximum number of response signals, at least one of a maximum allowed transmission power, an allowed transmission resource size, and a number of retransmissions of the transmitted ranging response signals are determined based on the CBR measured by the first UE.

3. The method of claim 1, wherein the CBR is a ranging request signal-specific CBR.

4. A user equipment (UE), comprising:
a transceiver configured for transmitting and receiving radio signals; and
a processor being operatively connected to the transceiver,
wherein the processor is configured to:
receive a first sidelink control information (SCI) format scheduling a first physical sidelink shared channel (PSSCH) from another UE;
receive multiple ranging request signals through the first PSSCH from the other UE;
transmit a second SCI format scheduling a second PSSCH to the other UE; and
transmit multiple ranging response signals for the multiple ranging request signals through the second PSSCH to the other UE,
wherein each of the first SCI format and the second SCI format comprises i) a priority field, ii) resource reservation field, iii) frequency resource location of initial transmission and retransmission field, iv) a time gap between initial transmission and retransmission field, v) modulation and coding scheme (MCS) field, vi) retransmission index field, and vii) reserved information bits,
wherein a number of the transmitted ranging response signals is less than or equal to a maximum number of response signals,
wherein the maximum number of response signals is determined based on a channel busy ratio (CBR) measured by the UE,
wherein based on the CBR being measured for the second PSSCH in subframe n, wherein n is an integer, the CBR is a portion of sub-channels in a resource pool whose Sidelink Received Signal Strength Indicator (S-RSSI) measured by the first UE exceeds a configured threshold sensed over subframes [n−100, n−1], and
wherein, among the multiple ranging request signals received by the UE, in a case where a number of successfully decoded ranging request signals is greater than the maximum number of response signals, ranging response signals for ranging request signals having a reception power relatively greater than a predetermined threshold value are transmitted.

5. The UE of claim 4, wherein, in addition to the maximum number of response signals, at least one of a maximum allowed transmission power, an allowed transmission resource size, and a number of retransmissions of the transmitted ranging response signals are determined based on the CBR measured by the UE.

6. The UE of claim 4, wherein the CBR is a ranging request signal-specific CBR.

7. An apparatus configured for operating in a wireless communication system, comprising:
   a processor; and
   a memory coupled to the processor,
   wherein the processor is configured to:
   receive a first sidelink control information (SCI) format scheduling a first physical sidelink shared channel (PSSCH) from another UE;
   receive multiple ranging request signals through the first PSSCH from the other UE;
   transmit a second SCI format scheduling a second PSSCH to the other UE; and
   transmit multiple ranging response signals for the multiple ranging request signals through the second PSSCH to the other UE,
   wherein each of the first SCI format and the second SCI format comprises i) a priority field, ii) resource reservation field, iii) frequency resource location of initial transmission and retransmission field, iv) a time gap between initial transmission and retransmission field, v) modulation and coding scheme (MCS) field, vi) retransmission index field, and vii) reserved information bits,
   wherein a number of the transmitted ranging response signals is less than or equal to a maximum number of response signals,
   wherein the maximum number of response signals is determined based on a channel busy ratio (CBR) measured by the apparatus,
   wherein based on the CBR being measured for the second PSSCH in subframe n, wherein n is an integer, the CBR is a portion of sub-channels in a resource pool whose Sidelink Received Signal Strength Indicator (S-RSSI) measured by the first UE exceeds a configured threshold sensed over subframes [n−100, n−1], and
   wherein, among the multiple ranging request signals received by the apparatus, in a case where a number of successfully decoded ranging request signals is greater than the maximum number of response signals, ranging response signals for ranging request signals having a reception power relatively greater than a predetermined threshold value are transmitted.

* * * * *